United States Patent
Tapio et al.

(10) Patent No.: US 10,471,681 B2
(45) Date of Patent: Nov. 12, 2019

(54) HEAT DE-BONDABLE ADHESIVE ARTICLES

(71) Applicant: 3M INNOVATIVE PROPERTIES COMPANY, St. Paul, MN (US)

(72) Inventors: Scott M. Tapio, Falcon Heights, MN (US); Audrey A. Sherman, Woodbury, MN (US); Kevin R. Schaffer, Woodbury, MN (US); Joseph D. Rule, Cottage Grove, MN (US); Lan H. Liu, Rosemount, MN (US); Margot A. Branigan, Roseville, MN (US); Ross E. Behling, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 352 days.

(21) Appl. No.: 14/416,520

(22) PCT Filed: Jul. 16, 2013

(86) PCT No.: PCT/US2013/050694
§ 371 (c)(1),
(2) Date: Jan. 22, 2015

(87) PCT Pub. No.: WO2014/018312
PCT Pub. Date: Jan. 30, 2014

(65) Prior Publication Data
US 2015/0210042 A1 Jul. 30, 2015

Related U.S. Application Data

(60) Provisional application No. 61/675,954, filed on Jul. 26, 2012.

(51) Int. Cl.
*B32B 7/12* (2006.01)
*B32B 37/12* (2006.01)
(Continued)

(52) U.S. Cl.
CPC ............... *B32B 7/12* (2013.01); *B32B 7/028* (2019.01); *B32B 27/302* (2013.01);
(Continued)

(58) Field of Classification Search
None
See application file for complete search history.

(56) References Cited

U.S. PATENT DOCUMENTS 2,532,011 A 11/1950 Dahlquist
2,736,721 A 2/1956 Dexter
(Continued)

FOREIGN PATENT DOCUMENTS

EP 1130070 9/2001
JP 8248887 9/1996
(Continued)

OTHER PUBLICATIONS

Hussein, "New Technologies for active disassembly: Using the Shape Memory Effect in Engineering Polymers", Int. J. Product Development, 2008, vol. 6, No. 3/4, pp. 431-449.
(Continued)

*Primary Examiner* — Frank D Ducheneaux
(74) *Attorney, Agent, or Firm* — Jeffrey M. Olofson

(57) ABSTRACT

Heat de-bondable adhesive articles include a heat-shrinkable optical substrate with optically clear adhesive disposed on the two major surfaces of the heat-shrinkable substrate. Optical articles can be prepared by disposing the heat de-bondable adhesive articles between two optical substrates. Other optical articles can be prepared by disposing an optically clear adhesive layer and a heat-shrinkable optical substrate on an optical substrate.

12 Claims, 2 Drawing Sheets

(51) Int. Cl.
| | |
|---|---|
| *B32B 37/18* | (2006.01) |
| *B32B 38/00* | (2006.01) |
| *B32B 27/30* | (2006.01) |
| *B32B 27/32* | (2006.01) |
| *B32B 27/36* | (2006.01) |
| *B32B 7/028* | (2019.01) |
| *C09J 7/22* | (2018.01) |
| *C09J 7/30* | (2018.01) |
| *C09J 7/35* | (2018.01) |
| *C09J 7/38* | (2018.01) |
| *B32B 37/14* | (2006.01) |

(52) U.S. Cl.
CPC ............ *B32B 27/308* (2013.01); *B32B 27/32* (2013.01); *B32B 27/36* (2013.01); *B32B 27/365* (2013.01); *B32B 37/12* (2013.01); *B32B 37/14* (2013.01); *B32B 37/18* (2013.01); *B32B 37/182* (2013.01); *B32B 38/00* (2013.01); *B32B 38/0036* (2013.01); *C09J 7/22* (2018.01); *C09J 7/30* (2018.01); *C09J 7/35* (2018.01); *C09J 7/38* (2018.01); *B32B 2255/10* (2013.01); *B32B 2255/26* (2013.01); *B32B 2270/00* (2013.01); *B32B 2307/40* (2013.01); *B32B 2307/412* (2013.01); *B32B 2307/70* (2013.01); *B32B 2307/736* (2013.01); *B32B 2405/00* (2013.01); *B32B 2551/00* (2013.01); *C09J 2201/128* (2013.01); *C09J 2201/606* (2013.01); *C09J 2201/622* (2013.01); *C09J 2203/318* (2013.01); *C09J 2400/226* (2013.01); *Y10T 156/10* (2015.01); *Y10T 428/266* (2015.01); *Y10T 428/2848* (2015.01)

(56) References Cited

U.S. PATENT DOCUMENTS

| | | |
|---|---|---|
| RE24,906 E | 12/1960 | Ulrich |
| 3,437,622 A | 4/1969 | Dahl |
| 3,718,712 A | 2/1973 | Tushaus |
| 3,841,890 A | 10/1974 | Coaker |
| 4,144,217 A | 3/1979 | Snelgrove |
| 4,436,858 A | 3/1984 | Klosiewicz |
| 4,629,663 A | 12/1986 | Brown |
| 4,637,950 A | 1/1987 | Bergeson |
| 4,816,333 A | 3/1989 | Lange |
| 5,139,832 A | 8/1992 | Hayashi |
| 5,145,935 A | 9/1992 | Hayashi |
| 5,155,199 A | 10/1992 | Hayashi |
| 5,209,971 A | 5/1993 | Babu |
| 5,214,119 A | 5/1993 | Leir |
| 5,223,465 A | 6/1993 | Ueki |
| 5,290,615 A | 3/1994 | Tushaus |
| RE34,605 E | 5/1994 | Schrenk |
| 5,360,659 A | 11/1994 | Arends |
| 5,441,810 A | 8/1995 | Aizawa |
| 5,506,300 A | 4/1996 | Ward |
| 5,579,162 A | 11/1996 | Bjornard |
| 5,585,186 A | 12/1996 | Scholz |
| 5,589,246 A | 12/1996 | Calhoun |
| 5,591,820 A | 1/1997 | Kydonieus |
| 5,665,822 A | 9/1997 | Bitler |
| 5,753,346 A | 5/1998 | Leir |
| 5,753,373 A | 5/1998 | Scholz |
| 5,873,931 A | 2/1999 | Scholz |
| 5,882,774 A | 3/1999 | Jonza |
| 5,888,650 A | 3/1999 | Calhoun |
| 6,049,419 A | 4/2000 | Wheatley |
| 6,060,159 A | 5/2000 | Delgado |
| 6,160,084 A | 12/2000 | Langer |
| 6,204,350 B1 | 3/2001 | Liu |
| 6,273,791 B1 | 8/2001 | Kataoka |
| 6,388,043 B1 | 5/2002 | Langer |
| 6,398,892 B1 | 6/2002 | Noguchi |
| 6,423,421 B1 | 7/2002 | Banaszak |
| 6,436,795 B2 | 8/2002 | Noguchi |
| 6,444,076 B1 | 9/2002 | Herndon |
| 6,483,611 B1 * | 11/2002 | Mizutani ............... G02B 5/0252 359/15 |
| 6,649,017 B1 | 11/2003 | Kurokawa |
| 6,660,354 B2 | 12/2003 | Suwa |
| 6,773,535 B1 | 8/2004 | Wetzel |
| 7,063,765 B2 | 6/2006 | Kudo |
| 7,078,093 B2 | 7/2006 | Sheridan |
| 7,173,096 B2 | 2/2007 | Mather |
| 7,229,687 B2 | 6/2007 | Kinning |
| 7,374,812 B2 | 5/2008 | Mizuno |
| 7,411,020 B2 | 8/2008 | Carlson |
| 7,927,533 B2 | 4/2011 | Kamiya |
| 8,124,169 B2 | 2/2012 | Ylitalo |
| 8,592,034 B2 | 11/2013 | Rule |
| 8,742,022 B2 | 6/2014 | Pokorny |
| 2001/0014492 A1 * | 8/2001 | Noguchi ............... H01L 21/6836 438/118 |
| 2004/0048062 A1 | 3/2004 | Nonaka |
| 2005/0073747 A1 | 4/2005 | Suzudo |
| 2005/0244353 A1 | 11/2005 | Lendlein |
| 2006/0041089 A1 | 2/2006 | Mather |
| 2007/0009465 A1 | 1/2007 | Lendlein |
| 2007/0074822 A1 | 4/2007 | Akechi |
| 2007/0297736 A1 | 12/2007 | Sherman |
| 2008/0121335 A1 | 5/2008 | Kiuchi |
| 2008/0131634 A1 | 6/2008 | Kiuchi |
| 2009/0053478 A1 | 2/2009 | Sakashita |
| 2009/0215351 A1 | 8/2009 | Kobayashi |
| 2009/0229732 A1 | 9/2009 | Determan |
| 2009/0229766 A1 | 9/2009 | Aveldson |
| 2010/0048804 A1 | 2/2010 | Determan |
| 2010/0252185 A1 | 10/2010 | Kiuchi |
| 2010/0258346 A1 | 10/2010 | Kiuchi |
| 2010/0279491 A1 | 11/2010 | Kiuchi |
| 2010/0316845 A1 | 12/2010 | Rule |
| 2011/0123800 A1 | 5/2011 | Sherman |
| 2011/0128371 A1 * | 6/2011 | Gastaldo ............... G01N 21/9501 348/126 |
| 2011/0195248 A1 | 8/2011 | Kiuchi |
| 2011/0281045 A1 | 11/2011 | Goubard |
| 2012/0100326 A1 | 4/2012 | Sherman |
| 2012/0270980 A1 | 10/2012 | Pokorny |

FOREIGN PATENT DOCUMENTS

| | | |
|---|---|---|
| JP | 10060391 | 3/1998 |
| JP | 200204332 | 7/2000 |
| JP | 2002-511974 | 4/2002 |
| KR | 2001-0067149 | 7/2001 |
| WO | WO 1998-55280 | 12/1998 |
| WO | WO 2000-40648 | 7/2000 |
| WO | WO 2000-75210 | 12/2000 |
| WO | WO 2009-085662 | 7/2009 |
| WO | WO 2009-089137 | 7/2009 |
| WO | WO 2009-105297 | 8/2009 |
| WO | WO 2009-114683 | 9/2009 |
| WO | WO 2011-119828 | 9/2011 |
| WO | WO 2012-024217 | 2/2012 |
| WO | WO 2012-036980 | 3/2012 |
| WO | WO 2013-012973 | 1/2013 |
| WO | WO 2014-018312 | 1/2014 |

OTHER PUBLICATIONS

Bragg, "The Form Birefringence of Macromolecules", Acta Crystallographica, 1953, vol. 6, pp. 865-867.

International Search Report for PCT International Application No. PCT/2013/050694, dated Sep. 27, 2013, 3 pgs.

* cited by examiner

HEAT DE-BONDABLE ADHESIVE ARTICLES

CROSS REFERENCE TO RELATED APPLICATIONS

This application is a national stage filing under 35 U.S.C. 371 of PCT/US2013/050694, filed Jul. 16, 2013, which claims priority to U.S. Provisional Application No. 61/675,954, filed Jul. 26, 2012, the disclosure of which is incorporated by reference in its/their entirety herein.

FIELD OF THE DISCLOSURE

This disclosure relates to adhesive articles that can be de-bonded by heat.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive (PSA) is particularly preferred for many applications.

PSAs are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear strength. The most commonly used polymers for preparation of PSAs are natural rubber, synthetic rubbers (e.g., styrene/butadiene copolymers (SBR) and styrene/isoprene/styrene (SIS) block copolymers), and various (meth)acrylate (e.g., acrylate and methacrylate) copolymers. With the exception of several (meth)acrylates, which are inherently tacky, these polymers are typically blended with appropriate tackifying resins to render them pressure sensitive.

A variety of adhesive articles have been described that are heat-responsive. By this it is meant that upon the application of heat to an adhesive article a response is generated. In some articles the response is to form a bond, in other instances it is to break a bond. In general four types of such articles have been described. The first group are ones in which the application of heat to an adhesive article is applied to form a bond. The second group of references is so called processing tapes, where a tape is applied to a substrate for one or more processing steps and then removed. The third group includes references to adhesive articles where an additive is present in the adhesive that is thermally responsive. The fourth group includes articles that contain heat responsive materials, either polymeric materials or metallic materials.

An example of the first group is EP Patent Publication No. 1,130,070 which describes thermally shrinkable films or labels for containers where the labels or films are affixed by the process of a) coating the thermally shrinkable film or label with a radiation curable adhesive, b) applying the film or label to the container, c) radiation curing the adhesive, and d) heating the container to shrink the film or label to permanently affix it to the container.

Examples of the second group, processing tapes, include a series of US Patent Publication Nos. 2008/0131634, 2010/0252185, and 2010/0279491 (all to Kiuchi et al.). These references describe adhesive coated sheets and tapes that are self-rolling. The sheets or tapes include a shrinkable film layer which upon shrinking rolls upon itself causing a peeling release from substrates to which the sheet or tape are adhered. U.S. Pat. No. 7,063,765 (Kudo et al.) describes a processing tape for wafer dicing in which adhesive layers are present in which the adhesion of the adhesive layers can be reduced by a chemical reaction. A method of processing a wafer article that includes a sheet containing sequentially, a first substrate, a first adhesive layer, a second substrate, and a second adhesive layer is described where the sheet is affixed to a wafer, the wafer is diced, the first substrate and first adhesive layer are removed by reducing the adhesion of the first adhesive layer, the wafer is divided into a plurality of chips and the second substrate and second adhesive layer are removed by reducing the adhesion of the second adhesive layer. PCT Publication No. WO 98/55280 describes a veneer tape that can be used to maintain a plurality of wood veneer substrates in fixed relation to each before and during a lamination process and is cleanly removable from the substrates following the lamination process. The tape backing may include a heat-shrinkable film.

Examples of the third group of adhesive articles where the adhesives contain heat responsive additives include US Patent Publication No. 2009/0053478 (Sakashita) which describes a functional film formed on a film formation substrate. The method of making the functional film includes: a) forming an electromagnetic wave absorbing layer on the substrate; b) forming a separation layer on the electromagnetic wave absorbing layer by using an inorganic material that forms a gas upon heating; c) forming a layer to be peeled containing a functional film; and d) applying electromagnetic wave to electromagnetic wave absorbing layer to reduce the bonding strength between the layer to be peeled and the substrate. Another example is PCT Publication No. WO 00/40648 which describes a heat debondable adhesive composition. The heat debondable adhesive compositions comprises a curable resin and a heat expandable inorganic material.

Examples of the fourth group of adhesive articles include materials that are heat responsive. US Patent Publication No. 2011/0281045 (Goubard, et al.) describes multilayer articles such as labels that include a hot melt pressure sensitive adhesive layer, a printable support layer, which may comprise a heat-shrinkable material, and a protective layer. The labels are removable by immersing in hot basic aqueous solutions. U.S. Pat. No. 5,441,810 (Aizawa et al.) describes an adhesive sheet comprising a substrate with a rubber-like elastic layer, a heat-expandable layer, and an adhesive layer. Some of the heat responsive articles include materials that are described as shape memory polymers. Shape memory polymers are materials that are formed in one shape, deformed to a second shape, and revert to their original shape upon the application of heat. U.S. Pat. No. 5,888,650 (Calhoun et al.) describes temperature-responsive adhesive articles with: a) a temperature-responsive carrier; and b) a thermomorphic pressure sensitive adhesive coated on at least a portion of the carrier. The articles have a wide range of bonding and de-bonding properties. U.S. Pat. No. 6,773,535 (Wetzel) describes a separable bonding system including two opposed rigid adherends and deformed shape memory alloy element disposed between and adhesively bonded to facing surfaces of the two rigid adherends. The shape memory alloy member is mechanically strained to form a deformed shape memory alloy member. The temperature is elevated sufficient to transform the deformed shape memory alloy member to a recovered shape, thereby weakening the adhesive bonds to the two rigid adherends.

US Patent Publication No. 2010/0316845 (Rule et al.) describes adhesive articles that contain shape memory polymer backings and are debondable from substrates or adherends with the application of heat. U.S. Patent Application Ser. No. 61/509,250, filed Jul. 19, 2011 with the title "DEBONDABLE ADHESIVE ARTICLE AND METHODS OF MAKING AND USING THE SAME" describes debondable adhesive articles including adhesive layers on opposing sides of shape-memory polymer sheet that includes a plurality of slits therein. The article can be debonded by heating the article to a temperature equal to or greater than a transition temperature for the shape-memory polymer sheet.

SUMMARY

Disclosed herein are heat de-bondable adhesive articles, optical articles made from these heat de-bondable adhesive articles and methods to make and heat de-bond optical articles.

In some embodiments, the adhesive articles comprise a first layer of optically clear adhesive with a first major surface and a second major surface, a heat-shrinkable optical substrate with a first major surface and a second major surface, where the first major surface of the heat-shrinkable substrate is disposed on the second major surface of the first layer of optically clear adhesive, and a second layer of optically clear adhesive with a first major surface and second major surface, where the first major surface of the second layer of optically clear adhesive is disposed on the second major surface of the heat-shrinkable substrate. At least part of the heat-shrinkable substrate has a threshold shrink force of at least 100 grams per inch (3.85 N/dm). The first adhesive layer and the second adhesive layer each has a Failure Force of from 0.1 to 85 grams per inch (0.039-3.3 N/dm). The Failure Force does not describe the failure of the actual adhesive article but is determined by testing model articles, where the model articles are prepared from the either the first adhesive layer and the heat shrinkable substrate or the second adhesive layer and the heat shrinkable substrate. The Failure Force is determined by measuring either the 90° Peel Adhesion at room temperature or the 180° Peel Adhesion at 100° C. to a glass substrate of the model articles.

Also described are optical articles. In some embodiments, the article comprises a first optical substrate with a first major surface and a second major surface, a second optical substrate with a first major surface and second major surface, and an adhesive article disposed between the two optical substrates. The adhesive articles are described above. The optical articles are arranged such that the first major surface of the first layer of optically clear adhesive is disposed on the second major surface of the first optical substrate, and the second major surface of the second layer of optically clear adhesive is disposed on the first major surface of the second optical substrate.

Other embodiments of optical articles comprise a first optical substrate with a first major surface and a second major surface, and an adhesive article disposed on the second major surface of first optical substrate. The adhesive article comprises a heat-shrinkable optical substrate with a first major surface and a second major surface and a first layer of optically clear adhesive disposed on the second major surface of the heat-shrinkable optical substrate. The optical article is arranged such that the first major surface of the first layer of optically clear adhesive is disposed on the second major surface of the first optical substrate. Like the adhesive articles described above, the heat-shrinkable substrate has a threshold shrink force of at least 100 grams per inch (3.85 N/dm), and the first adhesive layer has a Failure Force of from 0.1 to 400 grams per inch (0.039-15.4 N/dm). The Failure Force is determined by measuring either the 90° Peel Adhesion at room temperature or the 180° Peel Adhesion at 100° C. to a glass substrate of an article comprising the first adhesive layer and the heat shrinkable optical substrate as above.

Also described are methods of preparing and using optical articles. In some embodiments, the method comprises preparing a multi-layer article. Preparing the multi-layer article comprises providing an adhesive article, and disposing the adhesive article between a first optical substrate with a first major surface and a second major surface and a second optical substrate with a first major surface and a second major surface. The adhesive article comprises a first layer of optically clear adhesive with a first major surface and a second major surface, a heat-shrinkable optical substrate with a first major surface and a second major surface, where the first major surface of the heat-shrinkable substrate is disposed on the second major surface of the first layer of optically clear adhesive, and a second layer of optically clear adhesive with a first major surface and second major surface, where the first major surface of the second layer of optically clear adhesive is disposed on the second major surface of the heat-shrinkable substrate. At least part of the heat-shrinkable substrate has a threshold shrink force of at least 100 grams per inch (3.85 N/dm). The first adhesive layer and the second adhesive layer each has a Failure Force of from 0.1 to 85 grams per inch (0.039-3.3 N/dm). The Failure Force does not describe the failure of the actual adhesive article but is determined by testing model articles, where the model articles are prepared from the either the first adhesive layer and the heat shrinkable substrate or the second adhesive layer and the heat shrinkable substrate. The Failure Force is determined by measuring either the 90° Peel Adhesion at room temperature or the 180° Peel Adhesion at 100° C. to a glass substrate of the model articles. The first optical substrate is disposed on the first major surface of the first layer of optically clear adhesive, and the second optical substrate is disposed on the second major surface of the second layer of optically clear adhesive. In some embodiments, the method further comprises applying heat to the prepared multi-layer article sufficient to induce shrinkage in the heat-shrinkable substrate. In some embodiments, this shrinkage causes failure of the first optically clear adhesive layer and the second optically clear adhesive layer.

BRIEF DESCRIPTION OF THE DRAWINGS

The present application may be more completely understood in consideration of the following detailed description of various embodiments of the disclosure in connection with the accompanying drawings.

Figure 1A:
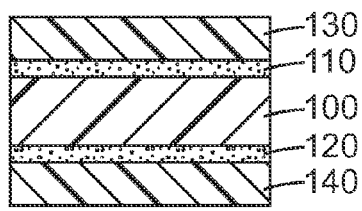
FIGS. 1A and 1B show cross sectional views of an adhesive article according to one embodiment of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Typically, adhesive articles comprise two adherends which are adhesively bonded by a layer of adhesive. The adherends can be a wide variety of substrates including films, plates, surfaces of articles, walls, floors, windows, and the like. The adherends can be flexible, rigid, semi-rigid, continuous or discontinuous. Similarly, the adhesive layer can be a pressure sensitive adhesive layer, a curable adhesive layer, or the like and can be relatively thick or thin and continuous or discontinuous.

Traditionally, the adhesive layer was utilized solely to form the adhesive bond between the two adherends. In these instances, the typical adhesive properties of tack, peel adhesion, and shear strength were the key parameters for these adhesives. However, the use of adhesives, especially pressure sensitive adhesives, in areas such as the medical, electronic and optical industries is increasing. The requirements of these industries place additional demands upon the pressure sensitive adhesive beyond the traditional properties of tack, peel adhesion and shear strength. For example, the optical industry places optical clarity and stability requirements (such as being non-yellowing over time and upon temperature exposure) upon the adhesive layer, especially if the adhesive layer is in the optical pathway. A variety of adhesives have been developed to address these increasing property requirements. Generally these efforts have led to adhesives that form very strong adhesive bonds to a wide variety of substrates.

While much effort has been expended in the development of adhesives that provide stronger adhesive bonds, bonds to a wider range of substrates, and that have a variety of additional properties such as weatherability, optical clarity, etc, comparatively little effort has been spent on the development of de-bondable adhesives. Many of the advantageous features of adhesives that provide strong and durable adhesive bonds, can also make it difficult and costly to take apart these bonds. Since adhesives are designed to effectively bond adherends to each other, in instances where it is desired to take apart the adhesive bond, for example to replace or repair an adhesively bonded adherend, the adhesive naturally resists this removal. Non-rigid adherends can often be removed by peeling the adherend from the adhesive or by peeling the adherend/adhesive layer from the adherend to which they are bonded. However, with rigid or semi-rigid adherend substrates, this removal by peel mechanisms is thwarted. Consider, for example, a typical panel of safety glass. In many instances this relatively simple optically clear article is actually a multi-layer article that includes two panes of glass, two layers of optically clear adhesive, and an optically clear film. Typically the article has the configuration: glass/adhesive/film/adhesive/glass. If this article needs to be taken apart for repairs or replacement of one or more of the substrates, there is no way to peel the glass substrates away from the adhesive or to peel the adhesive/glass article away from the film. This difficulty results regardless of the adhesive strength of the adhesive layers, since the overall article resists peeling. An example of this effect has been observed by any student who has placed a drop of water between two microscope slides in, for example, a biology class. Attempts to peel apart the two slides even though they are only held together by the surface tension of the water are generally fruitless and the slides have to be slid apart (a shear force). This effect is much stronger when adhesives are used to adhere together two rigid or semi-rigid substrates.

Therefore, adhesive articles that are heat de-bondable, are desirable. The term "heat de-bondable" as used herein refers to adhesive articles that upon the application of heat undergo a change in the adhesive bond such that one or both of the adherends can be removed from the adhesive layer. A heat de-bondable adhesive layer permits the adhesive layer to have a useful lifespan holding together adherends and also permits the removal of adherends to allow recycling or repairing of adhered substrates upon damage or at the end of the useful life of the article.

An added advantage of the heat de-bondable articles of this disclosure is that by using a heat-shrinkable substrate to induce the de-bonding, heating causes a permanent change in the article. In other words, once the article has been heated and the heat-shrinkable substrate has shrunk, the article does not go back to its pre-heated state upon cooling. This permits the article to be heated, for example in an oven, and then to be cooled and dismantled. The article does not have to be dismantled hot. This is in contrast to, for example, systems where the adhesive layers are thermally sensitive and lose their adhesive strength upon heating, but regain their adhesive strength upon cooling. Articles with this type of adhesive system would have to be dismantled while hot. Dismantling articles while hot is not only inconvenient and potentially dangerous to those doing the dismantling, it may not even be possible. For example, if the articles are placed on a conveyor belt and passed through an oven, it may not be possible to access the articles and dismantle them before they have cooled. In contrast, the articles of this disclosure can generally be heat de-bonded and then dismantled after cooling.

In this disclosure, adhesive articles are presented that utilize the combination of a heat-shrinkable substrate and an adhesive layer or adhesive layers with the desired properties to achieve heat de-bondable articles. The adhesive articles can be adhesively bonded to substrates to form adhesive constructions. Also disclosed are methods of preparing heat de-bondable articles as well as methods of using heat to de-bond these articles.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a Tg (glass transition temperature) or melting point (Tm) above room temperature. When the temperature is elevated above the Tg or Tm, the storage modulus usually decreases and the adhesive becomes tacky. Typically glass transition temperature (Tg) is measured using Differentially Scanning Calorimetry (DSC).

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

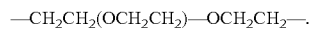

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —$R^a$—$Ar^a$— where $R^a$ is an alkylene and $Ar^a$ is an arylene (i.e., an alkylene is bonded to an arylene).

The term "(meth)acrylate" refers to monomeric acrylic or methacrylic esters of alcohols. Acrylate and methacrylate monomers are referred to collectively herein as "(meth)acrylate" monomers.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically clear" refers to an adhesive or article that has a high light transmittance over at least a portion of the visible light spectrum (about 400 to about 700 nm), and that exhibits low haze. Optically clear adhesives and articles generally have greater than 90% transmittance of visible light and haze values of 5% or less.

In this disclosure are presented adhesive articles that are multi-layer articles that comprise a heat-shrinkable substrate with a first major surface and a second major surface. Each of these major surfaces has an optically clear adhesive disposed on it. The optically clear adhesives may be the same or different. Such multi-layer articles with adhesive disposed on both major surfaces, when in the form of a tape are called double-sided tapes, or "transfer tapes". Transfer tapes are adhesive tapes that have adhesive on both exposed surfaces. In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. In this disclosure, the adhesive articles may be considered transfer tapes with an intervening layer that is a heat-shrinkable substrate. The heat-shrinkable substrate has a threshold shrink force (described below) and the adhesive layers have a Failure Force (described below) such that the adhesive article forms heat de-bondable adhesive bonds when adhered to substrates.

The shrink force of the heat-shrinkable substrate, together with the appropriate choice of adhesives (described below) with a desired Failure Force, provides heat de-bondable adhesive bonds. While not wishing to be bound by theory, it is believed that it is the combination of forces (shrink force and Failure Force) cooperating that provides the heat de-bonding.

A variety of different optically clear heat-shrinkable substrates are suitable for use in the adhesive articles of this disclosure. The optically clear heat-shrinkable substrate may be a single layer substrate or a multi-layer substrate. Heat-shrinkable substrates are substrates that are responsive to the application of heat, and may be considered a subset of the broader class of shape memory polymers. At least part of the optically clear heat-shrinkable substrate has a threshold shrink force. The threshold shrink force refers to the minimum shrink force suitable to give the desired heat de-bonding effect. The shrink force is the maximum force per unit width developed by a film during a temperature ramp through the film's glass transition temperature or melting temperature while the film is under restraint. The measurement is performed with the film in the machine orientation and the transverse orientation, and the greater of the two values is the shrink force. Suitable heat-shrinkable substrates have a threshold shrink force of at least about 100 grams per inch (3.85 N/dm). In some embodiments, the threshold shrink force is about 100 to about 500 grams per inch (3.85-19.3 N/dm) or 130 to about 440 grams per inch (5.20-16.9 N/dm), or even 135 to about 430 grams per inch (5.20-16.6 N/dm).

As described above, the shrink force of the heat-shrinkable substrate cooperates with the Failure Force of the adhesive layer to provide the heat de-bondable adhesive bonds. Typically, the heat-shrinkable substrate has been heated and stretched or elongated. This stretched substrate, upon the application of heat, relaxes toward the pre-stretched state to release the energy imparted to the substrate by stretching. It is this release of energy that provides the shrink force for the substrate. Additionally, as the heat-shrinkable substrate shrinks in length and or width, it generally grows in thickness to maintain an approximately constant volume. This growth in thickness provides an additional impetus for failure of the article, namely the growth in thickness provides a wedging action that helps to force apart the optical substrates.

Another way to characterize the shrink force is by the reduction in the area of the heat-shrinkable substrate upon heating, in other words, comparing the area of the heat-shrinkable substrate before and after heating. In some embodiments, the optically clear heat-shrinkable substrate has an initial area at ambient temperature and shrinks to no greater than 80% of the initial area upon exposure to 150° C. for 30 minutes.

Examples of suitable optically clear heat-shrinkable substrates include a wide variety of optically clear heat-shrinkable films. Among the suitable optically clear heat-shrinkable films are the so-called "shrink films" or "shrink wraps". Shrink films are polymeric films that are designed to be wrapped around an article to be covered, and upon the application of heat, the film shrinks to tightly fit over the covered article.

The shrink film can be designed to shrink in one direction (unidirectional or mono-directional) or in both directions (bidirectional) depending upon how it is prepared. Generally, heat shrink films are stretched when they are warm to orient the molecules from their initial random pattern. Cooling the film sets the film's characteristics until it is reheated to a sufficient temperature that causes it to shrink back toward its initial dimensions.

Examples of suitable shrink films are a polyolefin film, a poly(meth)acrylate film, a polyester film, a polystyrene film, a polycarbonate film, a vinyl film, a cellulose-based film (such as cellulose triacetate films), or a blend film. Blend films include films that are composed on one or more of the above materials in a blend, such as a film prepared from a blend of polyolefin and polyester materials. In some embodiments, polyolefin films and poly(meth)acrylate films are particularly suitable. Examples of commercially available films that are particularly suitable are presented in the Examples section below.

In some embodiments, the optically clear heat-shrinkable substrate comprises a multi-layer substrate. At least a portion of this multi-layer substrate has a threshold shrink force of at least 100 grams per inch (3.85 N/dm). All of the layers of the multi-layer substrate may be heat-shrinkable, or some layers may not be heat-shrinkable. The multiple layers may be adhesively bonded together or they may be laminated together through the use of pressure and/or heat. Some multi-layer substrates are prepared in a single step by multi-layer extrusion, other multi-layer substrates are prepared by lamination or bonding of separate layers of material.

In some embodiments, the multi-layer substrate comprises a central layer of optically clear heat-shrinkable film with sheathing layers of a different optically clear film that is not heat-shrinkable. As will be described in greater detail below, the sheathing layers can become sacrificial layers upon the application of heat, meaning that the sheathing layers adhere more strongly to the adhesive layer than to the central heat-shrinkable layer. Upon the application of heat the central heat-shrinkable layer shrinks causing the linkages between the central heat-shrinkable layer and the sheathing layers to break.

The heat shrink films described above can be used as the central heat-shrinkable layer of the multi-layer substrate. The sheathing layers can be formed from any suitable optically clear polymeric film layer. Examples of suitable polymeric films suitable for use as sheathing layers include polyester films, polyolefin films, poly(meth)acrylate films, cellulose films, and polyurethane films.

A wide variety of optically clear adhesives can be used in the adhesive articles of this disclosure. Among the suitable classes of adhesives are heat activated adhesives, pressure sensitive adhesives, gel adhesives, curable adhesives, and hot melt adhesives. The choice of adhesive for the adhesive article depends upon a wide range of factors such as the desired use for the adhesive article (such as the identity and composition of the substrates to which the adhesive is to be bonded, the environmental conditions the adhesive article to which the adhesive article is to be exposed, etc), and the other components in the adhesive article (especially the heat-shrinkable substrate).

Each adhesive layer in the adhesive article has a Failure Force of from about 0.1 to about 85 grams per inch (0.0039-3.3 N/dm). In some embodiments, the Failure Force is from 0.1 to about 70 grams per inch (0.0039-2.7 N/dm) or even 0.1 to about 31 grams per inch (0.0039-1.2 N/dm). This Failure Force is dependent upon the composition and properties of the adhesive and also upon the way the adhesive interacts with the heat-shrinkable substrate (for example if the heat-shrinkable substrate is a multi-layer article or has an adhesion reducing coating). The Failure Force is not measured directly for the adhesive article, but is modeled by the use of either 90° Peel Adhesion using an adapted version of the Test Method ASTM D3330-90 (as described in the Examples section) at room temperature or 180° Peel Adhesion at 100° C. using a modified version of the Test Method ASTM D3330-90 (as described in the Examples section) to a glass substrate of a test sample comprising the adhesive layer disposed on the heat-shrinkable substrate. In other words a test "tape" is prepared with the adhesive layer using the heat-shrinkable substrate as the backing. A conventional 90° Peel Adhesion Test (at room temperature) or a conventional 180° Peel Adhesion Test (at 100° C.) is then run using a glass substrate to measure the Failure Force value. The test typically is run at room temperature, but it may also be run at an elevated temperature, generally 100° C. The test may be run at an elevated temperature to more closely mimic the failure of the adhesive article in practice, since the failure of the adhesive article is at an elevated temperature. The use of an elevated temperature allows adhesives to be characterized that may not have the desired Failure Force value at room temperature, but do have the appropriate Failure Force under conditions more closely approximating the use conditions for the actual article (such as at an elevated temperature). An example of such an adhesive may be a hot melt type of adhesive. These adhesives can be cohesively quite strong at room temperature, but upon heating the cohesive strength drops dramatically, permitting cohesive failure of the adhesive (described in more detail below) during the elevated temperature peel adhesion test.

Just as the threshold shrink force is a characteristic and measurable physical property of the heat-shrinkable film, the Failure Force is a characteristic and measurable physical property of the adhesive. It should be noted that the Failure Force is a value associated only with the adhesive and is measured by the Peel Adhesion tests described above and does not refer to failure of the adhesive article. While it has been found that articles that have the desired combination of threshold shrink force and Failure Force will de-bond upon heating as desired, the Failure Force test is simply a model test used to characterize the adhesive.

The Failure Force is used as a model test because testing of the actual adhesive articles of this disclosure is either very difficult or impossible. Because many of the articles contain substrates that are rigid or semi-rigid, conventional peel adhesion tests cannot be run on these articles directly. Therefore, the Failure Force (in conjunction with the threshold shrink force) is used to determine which adhesives (and which combinations of adhesive and heat-shrinkable substrates) are suitable for use in the articles of this disclosure.

Determination of Failure Force Peel Adhesion values is a useful screening method, since they correlate to actual observed failures in adhesive articles, as will be shown in the Examples section. It must be noted however that the Failure Force values are only one factor for determining whether the adhesive article will de-bond upon heating. Other factors to take into account include the threshold shrink force of the heat-shrinkable substrate, the failure mode (discussed in greater detail below), as well as other factors such as the size of the adhesive article.

Failure Force value is used to characterize the adhesive because it is the failure of the combined adhesive/heat-shrinkable substrate that is desired for these articles and a variety of different failure modes are possible. At least four different failure mode scenarios are possible to generate the desired Failure Force values for adhesive articles of this disclosure. The Failure Force applies to both the first and second adhesive layer. If the adhesive layers are the same only one test need be run, but if the adhesive layers are different, the Failure Force for both adhesive layers are determined Because of the variable failure modes, a wide range of adhesive/heat-shrinkable substrate combinations are possible in the adhesive articles.

A first failure mode scenario for the Failure Force is cohesive failure of the adhesive layer. In this failure mode, when the standard 90° or 180° Peel Adhesion Test is run using a glass substrate, the adhesive cohesively splits and some adhesive is left on the glass substrate and some adhesive is left on the heat-shrinkable substrate.

A second failure mode scenario for the Failure Force is adhesive failure of the adhesive bonds. This means that the Failure Force of the first adhesive layer comprises adhesive failure of the first adhesive layer to the glass substrate, and the Failure Force of the second adhesive layer comprises adhesive failure of the second adhesive layer to the glass substrate. This failure mode is the failure mode typically observed in peel tests for pressure sensitive adhesives. In this failure mode, no adhesive (or essentially no adhesive) is left on the glass substrate, the adhesive is present on the heat-shrinkable substrate.

A third failure mode scenario for the Failure Force involves the use of multi-layer optically clear heat-shrinkable substrate (as described above). In this failure mode scenario, the Failure Force of the first adhesive layer comprises the peeling away of some layers of the multi-layer substrate and the retention of at least one layer of the multi-layer substrate to the first adhesive layer, and the Failure Force of the second adhesive layer comprises the peeling away of some layers of the multi-layer substrate and the retention of at least one layer of the multi-layer substrate to the second adhesive layer. In this failure mode, the failure occurs between layers of the heat-shrinkable substrate, and the adhesive remains adhered to the glass substrate together with at least one layer of the heat-shrinkable substrate.

A fourth failure mode scenario for the Failure Force is failure of the adhesive/heat-shrinkable substrate bond. In this failure mode scenario, the heat-shrinkable substrate is peeled away from the adhesive layer, leaving the adhesive layer on the glass substrate. This scenario is different from the third failure mode scenario described above in that in this failure mode scenario the heat-shrinkable substrate remains essentially intact.

As described above, each of these failure mode scenarios is for a model of the actual adhesive article. The model is useful to describe the actual adhesive article because the failure modes of the model mimic the failure modes of the actual adhesive article when heated to cause de-bonding. When the adhesive articles are heated, the shrink force of the optically clear heat-shrinkable substrate provides an input of force to cause the desired de-bonding. This de-bonding can be cohesive failure of the adhesive layer (as mimicked by the first failure mode scenario); the de-bonding may be adhesive failure of the adhesive layer from the substrates to which the adhesive is bonded (as mimicked by the second failure mode scenario); the de-bonding may be cohesive failure of the multi-layer optically clear heat-shrinkable substrate (as mimicked by the third failure mode scenario); or the de-bonding may be adhesive failure between the adhesive layer and the optically clear heat-shrinkable substrate (as mimicked by the fourth failure mode scenario). Additionally, the de-bonding of the actual adhesive article (and the model used to mimic this de-bonding) may be a combination of these failure mode scenarios. For example, the failure mode of the model test could be combination of adhesive failure and cohesive failure, meaning that upon running the model test, some adhesive may be left on the glass substrate but most of the adhesive is left on the heat-shrinkable substrate. This combined failure mode can be reflected in the failure mode of the actual adhesive article by a mixture of cohesive and adhesive failure of the adhesive layers upon heating. Similarly, the failure mode of the model test could be combination of cohesive failure of the multi-layer heat-shrinkable substrate and failure of the adhesive/multi-layer heat-shrinkable substrate, meaning that some of the heat-shrinkable substrate remains attached to the adhesive layer but most or the heat-shrinkable substrate peels away from the adhesive layer.

Because the Failure Force can include a wide variety of failure modes, a wide selection of adhesives are suitable depending upon the selection of optically clear heat-shrinkable substrate and the desired failure mode for de-bonding of the adhesive article. A few illustrative examples are described below to illustrate the range of possibilities, but in no way are these illustrative examples an exhaustive list of possibilities, and these examples are presented for illustration only and should not be viewed as unduly limiting this disclosure.

For example, if the desired failure mode of the adhesive article is cohesive failure of the adhesive layer, the desired adhesive is one that is cohesively weak. Examples of such adhesives include gel adhesives and some cohesively weak pressure sensitive and heat activated adhesives. Cohesive strength can be determined in a variety of methods (beside the 90° and 180° Peel Adhesion tests described above), for example by determining the shear holding power of the adhesive. Also, as described above, hot melt adhesives, while they may have high cohesive strength at room temperature have low cohesive strength at elevated temperature. This low cohesive strength at elevated temperature is necessary for the adhesive to flow at elevated temperatures.

In some embodiments, the desired failure mode of the adhesive article is adhesive failure of the adhesive-substrate bond. Since, as will be described in greater detail below, many of the suitable substrates in the adhesive articles are glass substrates or other similar substrates, this failure mode is well modeled by the Peel Adhesion tests from glass substrates. Generally, suitable adhesives for this failure mode will have low adhesion to the substrates. This low adhesion may be a characteristic of the adhesive itself, or it can be produced through the use of coatings on the substrate to limit the adhesion of the adhesive layer to the substrate. Such coatings are more commonly used with film substrates (as described below) but can also be used with rigid and semi-rigid substrates. For example, the substrate could be coated with a low surface energy material to decrease the adhesion of the substrate-adhesive bond. Examples of such low surface energy materials include a variety of release coatings. The release coating could be applied to only portions of the substrate to permit sufficient adhesion of the adhesive during application and use of the adhesive article, but upon the application of heat and shrinkage of the heat-shrinkable substrate, the substrate-adhesive bond could fail. Additionally, the release coating could be a material such as is used on the back side of rolled tape products to permit the tape to be rolled up and remain intact and then to be unwound for use. Such materials are sometimes called Low Adhesion Backsizes or LABs. A wide variety of LABs have been developed for use with a wide variety of adhesives. Examples of suitable LAB or release coatings that are suitable include the water-based fluorochemical materials described in U.S. Pat. No. 7,411,020 (Carlson et al.); the polysiloxane release coatings described in U.S. Pat. No. 5,753,346 (Leir et al.); the release compositions describe in U.S. Pat. No. 7,229,687 (Kinning et al.); the polyvinyl N-alkyl carbamates described in U.S. Pat. No. 2,532,011 (Dalquist et al.); the moisture-curable materials described in U.S. Pat. No. 6,204,350 (Liu et al.); and the organopolysiloxane-poyurea copolymer release agents described in U.S. Pat. No. 5,290,615 (Tushaus et al.).

Another example of a coating that could be used is a heat sensitive primer coating. These primer coatings, when applied to the substrate, can provide a surface to which the adhesive layer adheres strongly. However, upon the application of heat, the primer layer changes to a surface to which the adhesive layer does not adhere strongly, permitting failure of the substrate-adhesive bond. This can occur by thermal degradation of the primer layer, for example.

Another example is one in which the desired failure mode of the adhesive article is cohesive failure of the optically clear heat-activatable substrate. In this example, it is desirable that the bond between the internal layer or layers of a multi-layer optically clear heat-shrinkable substrate and the external layers of the optically clear heat-activatable substrate be weak. This relatively weak bond can be achieved in a variety of ways, for example by laminating or weakly bonding the external layers to the internal layer or layers or by placing a removable coating on the internal layer or layers. When the adhesive layers are applied to the optically clear heat-activatable substrate, the bond between the adhesive layer and the external layer is stronger than the bond between external layer and the internal layer or layers. Upon the application of a force (peel force in the case of the test model, shrink force in the case of the actual adhesive article), the bond between the external layers and the internal layer or layer break preferentially and the external layers remain bonded to the adhesive layers. Because it is the bond between the external layers and the internal layers of the optically clear heat-shrinkable substrate that are targeted for de-bonding in this example, a wide range of adhesives that bond strongly to the external layers of the optically clear heat-shrinkable substrate can be used. A wide range of pressure sensitive and heat activated adhesives can be used as well as certain curable adhesives.

Another example is one in which the desired failure mode is between the adhesive layer and the optically clear heat-shrinkable substrate. This can be achieved by the selection of optically clear heat-shrinkable substrates and adhesives that do not have good compatibility. For example, if the optically clear heat-shrinkable substrate is made of a low surface energy material such as an olefinic material, a number of adhesives could be chosen that would have low adhesive strength to the olefinic material. Additionally, the optically clear heat-activatable substrate could be coated with a low surface energy material to decrease the adhesion of the substrate-adhesive bond. Examples of such low surface energy materials include a variety of release coatings. The release coating could be applied to only portions of the optically clear heat-shrinkable substrate to permit sufficient adhesion of the adhesive during application and use of the adhesive article, but upon the application of heat and shrinkage of the heat-shrinkable substrate, the substrate-adhesive bond could fail. Additionally, the release coating could be a material such as is used on the back side of rolled tape products to permit the tape to be rolled up and remain intact and then to be unwound for use. Such materials are sometimes called Low Adhesion Backsizes or LABs. A wide variety of LABs have been developed for use with a wide variety of adhesives. Another example of a coating that could be used is heat sensitive primer coatings. These primer coatings, when applied to the heat-shrinkable substrate, can provide a surface to which the adhesive layer adheres strongly. However, upon the application of heat, the primer layer changes to a surface to which the adhesive layer does not adhere strongly, permitting failure of the heat-shrinkable substrate-adhesive bond. This can occur by thermal degradation of the primer layer, for example.

When the articles comprise an optical substrate/optically clear adhesive/heat-shrinkable optical substrate (as will be described in more detail below), additional failure modes are possible. In these articles, because the heat-shrinkable optical substrate is not bonded to a second optical substrate, the heat-shrinkable optical substrate may curl upon shrinkage. When the heat-shrinkable optical substrate curls upon itself it may carry with it the adhesive layer or a portion of the adhesive layer or it may be free of the adhesive layer. In other words, the adhesive layer may fail adhesively from the optical substrate, the adhesive may fail cohesively, the adhesive may fail adhesively from the heat-shrinkable optical substrate, or the adhesive may fail by a combination of these modes. This curling of heat-shrinkable substrates has been described, for example, for the processing tapes described in US Patent Publication Nos. 2008/0131634, 2010/0252185, and 2010/0279491 (all to Kiuchi et al.).

As discussed above, a wide range of optically clear adhesives are suitable for use with the adhesive articles of this disclosure. Examples of suitable optically clear adhesives include heat activated adhesives, pressure sensitive adhesives, gel adhesives, curable adhesives, and hot melt adhesives. Examples of each are described below.

Examples of suitable optically clear heat activated adhesives include polyvinyl butyrals, ionomers, polyolefins, or combinations thereof.

In some embodiments, the adhesive layer is at least partially formed of polyvinyl butyral. The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated, of St. Louis, Mo., under the trade name "BUTVAR" resin.

In some instances, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

Examples of suitable ionomeric adhesives are the "ionoplast resins". Ionoplast resins are copolymers of ethylene and unsaturated carboxylic acids, wherein at least a portion of the acid groups in the copolymer have been neutralized to the salt form of the acid. Extruded sheets of ionoplast resins suitable for use in this disclosure are commercially available from DuPont Chemicals, Wilmington, Del., under the trade name "SENTRYGLASS PLUS".

Examples of suitable polyolefin adhesives include ethylene/α-olefin copolymers. As used herein, the term "ethylene/α-olefin copolymer" refers to polymers comprising a class of hydrocarbons manufactured by the catalytic oligomerization (i.e., polymerization to low-molecular-weight products) of ethylene and linear α-olefin monomers. The ethylene/α-olefin copolymers may be made, for example, with a single site catalyst such as a metallocene catalyst or multi-site catalysts such as Ziegler-Natta and Phillips catalysts. The linear α-olefin monomers typically are 1-butene or 1-octene but may range from C3 to C20 linear, branched or cyclic α-olefin. The α-olefin may be branched but only if the branch is at least alpha to the double bond, such as 3-methyl-1-pentene. Examples of C3-C20 α-olefins include propylene, 1-butene, 4-methyl-1-butene, 1-hexene, 1-octene, 1-dodecene, 1-tetradecene, 1-hexadecene and 1-octadecene. The α-olefins can also contain a cyclic structure such as cyclohexane or cyclopentane, resulting in an α-olefin such as 3-cyclohexyl-1 propene (allyl cyclohexane) and vinyl cyclohexane. Although not α-olefins in the classical sense of the term, for purposes of this disclosure certain cyclic olefins, such as norbornene and related olefins, are α-olefins and can be used. Similarly, styrene and its related olefins (for example, a-methyl styrene) are α-olefins for the purposes of this disclosure. Acrylic and methacrylic acid and their respective ionomers, and acrylates and methacrylates, however are not α-olefins for the purposes of this disclosure. Illustrative ethylene/α-olefin copolymers include ethylene/1-butene, ethylene/1-octene, ethylene/1-butene/1-octene, ethylene/styrene. The polymers can be block or random. Exemplary commercially available low crystalline ethylene/α-olefin copolymers include resins sold under the tradenames "ENGAGE" ethylene/1-butene and ethylene/1-octene copolymers and "FLEXOMER" ethylene/1-hexene copolymer, available from Dow Chemical Co., and homogeneously branched, substantially linear ethylene/α-olefin copolymers such as "TAFMER", available from Mitsui Petrochemicals Company Limited, and "EXACT", available from ExxonMobil Corp. As used herein, the term "copolymer" refers to polymers made from at least 2 monomers.

In some of these embodiments, the α-olefin moiety of the ethylene/α-olefin copolymer includes four or more carbons. In some embodiments, the ethylene/α-olefin copolymer is a low crystalline ethylene/α-olefin copolymer. As used herein, the term "low crystalline" means crystallinity (according to method disclosed in ASTM F2625-07) of less than 50% by weight. In some embodiments, the low crystalline ethylene/α-olefin copolymer is a butene α-olefin. In some embodiments the α-olefin of the low crystalline ethylene/α-olefin copolymer has 4 or more carbons.

In some embodiments, the low crystalline ethylene/α-olefin copolymer has a DSC peak melting point of less than or equal to 50° C. As used herein, the term "DSC peak melting point" means a melting point determined by DSC (10°/min) under nitrogen purge as the peak with the largest area under the DSC curve.

Examples of suitable optically clear pressure sensitive adhesives include those based on natural rubbers, synthetic rubbers, styrene block copolymers, polyvinyl ethers, acrylics, poly-α-olefins, silicones, urethanes or ureas.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade.

Tackifying resins used with natural rubbers generally include but are not limited to wood rosin and its hydrogenated derivatives; terpene resins of various softening points, and petroleum-based resins, such as, the "ESCOREZ 1300" series of C5 aliphatic olefin-derived resins from Exxon, and "PICCOLYTE S" series, polyterpenes from Hercules, Inc. Antioxidants are used to retard the oxidative attack on natural rubber, which can result in loss of the cohesive strength of the natural rubber adhesive. Useful antioxidants include but are not limited to amines, such as N—N' di-ß-naphthyl-1,4-phenylenediamine, available as "AGERITE D"; phenolics, such as 2,5-di-(t-amyl)hydroquinone, available as "SANTOVAR A", available from Monsanto Chemical Co., tetrakis [methylene 3-(3',5'-di-tert-butyl-4'-hydroxyphenyl)propianate]methane, available as "IRGANOX 1010" from Ciba-Geigy Corp., and 2-2'-methylenebis(4-methyl-6-tert butyl phenol), available as Antioxidant 2246; and dithiocarbamates, such as zinc dithiodibutyl carbamate. Other materials can be added to natural rubber adhesives for special purposes, wherein the additions can include plasticizers, pigments, and curing agents to partially vulcanize the pressure sensitive adhesive.

Another useful class of pressure sensitive adhesives are those comprising synthetic rubber. Such adhesives are generally rubbery elastomers, which are either self-tacky or non tacky and require tackifiers.

Self-tacky synthetic rubber pressure sensitive adhesives include for example, butyl rubber, a copolymer of isobutylene with less than 3 percent isoprene, polyisobutylene, a homopolymer of isoprene, polybutadiene, such as "TAKTENE 220 BAYER" or styrene/butadiene rubber. Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as "IRGANOX 1010". An example of a synthetic rubber is "AMERIPOL 1011A", a styrene/butadiene rubber available from BF Goodrich. Tackifiers that are useful include derivatives of rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of $C_5$ aliphatic olefin-derived resins, the "ESCOREZ 2000" Series of $C_9$ aromatic/aliphatic olefin-derived resins, and polyaromatic $C_9$ resins, such as the "PICCO 5000" series of aromatic hydrocarbon resins, from Hercules, Inc. Other materials can be added for special purposes, including hydrogenated butyl rubber, pigments, plasticizers, liquid rubbers, such as "VISTANEX LMMH" polyisobutylene liquid rubber available from Exxon, and curing agents to vulcanize the adhesive partially.

Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as "KRATON D1107P", available from Shell Chemical Co., and "EUROPRENE SOL TE 9110", available from EniChem Elastomers Americas, Inc.; linear styrene-(ethylene-butylene) block copolymers such as "KRATON G1657", available from Shell Chemical Co.; linear styrene-(ethylene-propylene) block copolymers such as "KRATON G1750X", available from Shell Chemical Co.; and linear, radial, and star styrene-butadiene block copolymers such as "KRATON D1118X", available from Shell Chemical Co., and "EUROPRENE SOL TE 6205", available from EniChem Elastomers Americas, Inc. The polystyrene blocks tend to form domains in the shape of spheroids, cylinders, or plates that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as the "ESCOREZ 1300" series and the "WINGTACK" series, available from Goodyear; rosin esters, such as the "FORAL" series and the "STAYBELITE" Ester 10, both available from Hercules, Inc.; hydrogenated hydrocarbons, such as the "ESCOREZ 5000" series, available from Exxon; polyterpenes, such as the "PICCOLYTE A" series; and terpene phenolic resins derived from petroleum or terpentine sources, such as "PICCOFYN A100", available from Hercules, Inc. Resins that associate with the thermoplastic phase tend to stiffen the pressure sensitive adhesive. Thermoplastic phase associating resins include polyaromatics, such as the "PICCO 6000" series of aromatic hydrocarbon resins, available from Hercules, Inc.; coumarone-indene resins, such as the "CUMAR" series, available from Neville; and other high-solubility parameter resins derived from coal tar or petroleum and having softening points above about 85° C., such as the "AMOCO 18" series of alphamethyl styrene resins, available from Amoco, "PICCOVAR 130" alkyl aromatic polyindene resin, available from Hercules, Inc., and the "PICCOTEX" series of alphamethyl styrene/vinyl toluene resins, available from Hercules. Other materials can be added for special purposes, including rubber phase plasticizing hydrocarbon oils, such as, "TUFFLO 6056", available from Lydondell Petrochemical Co., Polybutene-8 from Chevron, "KAYDOL", available from Witco, and "SHELLFLEX 371", available from Shell Chemical Co.; pigments; antioxidants, such as "IRGANOX 1010" and "IRGANOX 1076", both available from Ciba-Geigy Corp., "BUTAZATE", available from Uniroyal Chemical Co., "CYANOX LDTP", available from American Cyanamid, and "BUTASAN", available from Monsanto Co.; antiozonants, such as "NBC", a nickel dibutyldithiocarbamate, available from DuPont; liquid rubbers such as "VISTANEX LMMH" polyisobutylene rubber; and ultraviolet light inhibitors, such as "IRGANOX 1010" and "TINUVIN P", available from Ciba-Geigy Corp.

Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether such as "LUTANOL M 40", available from BASF, and "GANTREZ M 574" and "GANTREZ 555", available from ISP Technologies, Inc.; vinyl ethyl ether such as "LUTANOL A 25", "LUTANOL A 50" and "LUTANOL A 100"; vinyl isobutyl ether such as "LUTANOL 130", "LUTANOL 160", "LUTANOL IC", "LUTANOL I60D" and "LUTANOL I 65D"; methacrylate/vinyl isobutyl ether/acrylic acid such as "ACRONAL 550 D", available from BASF. Antioxidants useful to stabilize the polyvinylether pressure sensitive adhesive include, for example, "IONOX 30" available from Shell, "IRGANOX 1010" available from Ciba-Geigy, and antioxidant "ZKF" available from Bayer Leverkusen. Other materials can be added for special purposes as described in BASF literature including tackifier, plasticizer and pigments.

Acrylic pressure sensitive adhesives generally have a glass transition temperature of about −20° C. or less and may comprise from 100 to 80 weight percent of a $C_3$-$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Generally, the acrylic pressure sensitive adhesives comprise from 0 to 20 weight percent of acrylic acid and from 100 to 80 weight percent of isooctyl acrylate. The acrylic pressure sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and ß-pinene, available as "PICCOLYTE A-115" and "ZONAREZ B-100" from Arizona Chemical Co. Other materials can be added for special purposes, including hydrogenated butyl rubber, pigments, and curing agents to vulcanize the adhesive partially.

Poly-α-olefin pressure sensitive adhesives, also called a poly(1-alkene) pressure sensitive adhesives, generally comprise either a substantially uncrosslinked polymer or a uncrosslinked polymer that may have radiation activatable functional groups grafted thereon as described in U.S. Pat. No. 5,209,971 (Babu, et al) which is incorporated herein by reference. The poly-α-olefin polymer may be self tacky and/or include one or more tackifying materials. If uncrosslinked, the inherent viscosity of the polymer is generally between about 0.7 and 5.0 dL/g as measured by ASTM D 2857-93, "Standard Practice for Dilute Solution Viscosity of Polymers". In addition, the polymer generally is predominantly amorphous. Useful poly-α-olefin polymers include, for example, $C_3$-$C_{18}$ poly(1-alkene) polymers, generally $C_5$-$C_{12}$ α-olefins and copolymers of those with $C_3$ or $C_6$-$C_8$ and copolymers of those with $C_3$. Tackifying materials are typically resins that are miscible in the poly-α-olefin polymer. The total amount of tackifying resin in the poly-α-olefin polymer ranges between 0 to 150 parts by weight per 100 parts of the poly-α-olefin polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a $C_5$ olefin fraction of this type are "WINGTACK 95" and "WINGTACK 15" tackifying resins available from Goodyear Tire and Rubber Co. Other hydrocarbon resins include "REGALREZ 1078" and "REGALREZ 1126" available from Hercules Chemical Co., and "ARKON P115" available from Arakawa Chemical Co. Other materials can be added for special purposes, including antioxidants, fillers, pigments, and radiation activated crosslinking agents.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups ($OSiMe_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir, et al). Other materials can be added for special purposes, including, pigments, plasticizers, and fillers. Fillers are typically used in amounts from 0 parts to 10 parts per 100 parts of silicone pressure sensitive adhesive. Examples of fillers that can be used include zinc oxide, silica, carbon black, pigments, metal powders and calcium carbonate.

Useful polyurethane and polyurea pressure sensitive adhesives useful include, for example, those disclosed in WO 00/75210 (Kinning et al.) and in U.S. Pat. No. 3,718, 712 (Tushaus); U.S. Pat. No. 3,437,622 (Dahl); and U.S. Pat. No. 5,591,820 (Kydonieus et al.). Additionally, the urea-based pressure sensitive adhesives described in US Patent Publication No. 2011/0123800 (Sherman et al.) and the urethane-based pressure sensitive adhesives described in US Patent Publication No. 2012/0100326 (Sherman et al.) may be particularly suitable.

Examples of suitable optically clear gel adhesives include, for example cross-linked or cross-linkable silicone gel adhesives. The cross-linked or cross-linkable silicone gel adhesives can be formed of any useful silicone materials such as, for example, dimethylsilicone, diphenylsilicone, or phenylmethylsilicone. In some embodiments, the cross-linked or cross-linkable silicone gel may be chosen to give a relatively high refractive index, such as a refractive index in a range from 1.5 to 1.6 or from 1.5 to 1.58, or from 1.51 to 1.57. In one embodiment, the cross-linked or cross-linkable silicone gel has a refractive index in a range from 1.51 to 1.53. In one embodiment, the cross-linked silicone gel can include phenylmethylsilicone moieties that are cross-linked. In another embodiment, the cross-linked silicone gel can include phenylmethylsilicone moieties which are cross-linked and phenylmethylsilicone oil. In some embodiments, the cross-linked silicone gel includes cross-linked phenylmethylsilicone moieties and phenylmethylsilicone oil in a weight ratio from 1:5 to 5:1, or 1:4 to 4:1, or 1:3 to 3:1. In one embodiment, the cross-linked silicone gel includes cross-linked phenylmethylsilicone moieties and phenylmethylsilicone oil in a weight ratio from 1:3 to 1:1. In one illustrative embodiment, the uncured silicone includes phenylmethylsilicone having a refractive index of 1.52 at 589 nm, a viscosity of 400 cP and is commercially available under the tradename LS-3252 Encapsulation Gel from Lightspan, LLC (Wareham, Mass.) Upon curing, this cross-linked silicone forms a gel having a Durometer of 10, a specific gravity of 1.07, with a refractive index of 1.52 at 589 nm. Other gels formed from cross-linked or cross-linkable silicone materials may have lower refractive indices.

Examples of suitable curable adhesives include adhesives that are applied as a liquid and then cured to form an optically clear adhesive layer. These types of adhesives are becoming more prevalent in the display industry to fill the air gap between coverglass and ITO touch sensors, and ITO touch sensors and liquid crystal module, or directly between the coverglass and the liquid crystal module.

Examples of suitable curable liquid adhesives and the methods for using them in optical devices are described in US Patent Publication No. 2009/0215351 (Kobayashi et al.) and PCT Publication Nos. WO 2012/036980 and WO 2011/119828. The photo-curable resins for manufacturing display devices described in U.S. Pat. No. 7,927,533 (Kamiya et al.) are also suitable, as well as the stress-relieving optical adhesives described in PCT Publication No. WO 2012/024217.

A variety of hot melt adhesives are suitable. Examples of suitable hot melt adhesives include optically clear (meth) acrylate-based hot melt adhesives and ethylene vinyl acetate hot malt adhesives.

The optically clear (meth)acrylate-based hot melt adhesives typically are prepared from (meth)acrylate polymers that have a glass transition temperature (Tg) of greater than room temperature, more typically greater than about 40° C., and are prepared from alkyl(meth)acrylate monomers. Useful alkyl(meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic hot melt adhesives may also contain optional co-monomer components such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

Examples of suitable ethylene vinyl acetate (EVA) adhesives include a wide range of commercially available EVA hot melt adhesives. Typically these EVA hot melt adhesives have a vinyl acetate content of from about 18-29% by weight of the polymer. The adhesives typically have high amounts of tackifiers and waxes. An exemplary composition is one with 30-40% by weight of EVA polymer, 30-40% by weight of tackifier, 20-30% by weight of wax, and 0.5-1% by weight of stabilizers. Examples of suitable EVA hot melt adhesives are the BYNEL SERIES 3800 resins commercially available from DuPont, Wilmington, Del. (including BYNEL 3810, BYNEL 3859, BYNEL 3860, and BYNEL 3861). A particularly suitable EVA hot melt adhesive is the material available from Bridgestone Corp. Tokyo, JP under the trade name "EVASAFE".

The multi-layer adhesive articles described above may contain additional optional elements. In some embodiments, it may be desirable to have a release liner in contact with one or both of the adhesive layers of the adhesive article. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

Figure 1B:
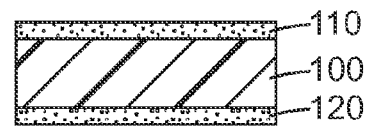

An exemplary adhesive article of this disclosure is shown in FIGS. 1A and 1B. In FIG. 1A, the adhesive article comprises optically clear heat-shrinkable substrate 100 with adhesive layers 110 and 120 disposed thereon. As described above, adhesive layers 110 and 120 may be the same or different. Disposed on the adhesive layer 110 is release substrate 130 and disposed on adhesive layer 120 is release substrate 140. Release substrates 130 and 140 may be the same or different and may be release liners. In some embodiments, one or both of release substrates 130 and 140 are microstructured release liners. FIG. 1B is the article of FIG. 1A in which the release substrates 130 and 140 have been removed.

Also disclosed herein are multi-layer optical articles prepared using the adhesive articles described above. In some embodiments, the optical articles comprise two optical substrates and other optical articles comprise a single optical substrate.

In some embodiments, the optical articles comprise a first optical substrate and a second optical substrate. The optical substrates are adhered to the layers of optically clear adhesive described above for the adhesive articles of this disclosure. The first optical substrate is adhered to the first layer of optically clear adhesive. The first layer of optically clear adhesive is disposed on a heat-shrinkable optical substrate. The other surface of the heat-shrinkable optical substrate has a second optically clear adhesive layer disposed on it. This second layer of optically clear adhesive is adhered to a second optical substrate. The optically clear heat-shrinkable substrate and optically clear adhesive layers have been described above.

The constructions of this disclosure include the multi-component adhesive articles described above, and two optical substrates. A wide variety of optical substrates are suitable for forming the constructions of this disclosure. The optical substrates may be the same or different. As used herein, the term "optical substrate" refers to a substrate that can be used to produce an optical effect. The substrate can be rigid, semi-rigid or flexible. The substrate can be any suitable thickness. The optical substrates often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical substrates include, but are not limited to, plates, sheets, the surfaces of optical articles, and films. Examples of suitable optical substrates are described in greater detail below. Typically at least one of the optical substrates is optically transparent or optically clear.

The adhesive articles of this disclosure are particularly suitable for use in optical articles where at least one of the substrates is rigid or semi-rigid, because these articles can be very difficult to de-bond. Articles where both substrates are flexible often can be de-bonded through the use of a peel mechanism. However, even optical articles where both substrates are flexible are suitable for use with the adhesive articles of this disclosure because often de-bonding by peel force, especially for large surface area substrates, can be difficult, time consuming and labor intensive. Therefore, heat de-bondability can also be desirable for optical articles with flexible substrates and such articles are within the scope of this disclosure.

Examples of optically clear rigid and semi-rigid substrates include plates, sheets, the surfaces of articles, and the like. The rigid or semi-rigid substrate may be optically clear, optically transparent or non-transparent. Examples of non-transparent substrates include ones that are reflective scattering elements.

Examples of plates include a wide array of optically clear materials. Examples of suitable plates include a variety of glasses or polymeric materials such as polycarbonate or polymethyl methacrylate. The plates may be in a variety of thickness and may be flat or curved. In some embodiments, the plate may also comprise additional layers or treatments. Examples of additional layers include, for example, layers of film designed to provide tinting, shatter resistance and the like. Examples of additional treatments that may be present include, for example, coatings or various types such as hardcoats.

Sheets are similar to plates but generally are thinner and less rigid than plates. Examples of sheets include, for example, optically clear semi-rigid substrates of glass or other optically clear materials that are 25-100 micrometers in thickness.

Examples of substrates that are the surface of an article include, but are not limited to, the outer surface of an electronic display such as liquid crystal display or a cathode ray tube, an electronic device such as a touch screen, the outer surface of a window or glazing, the outer surface of an optical component such as a reflector, polarizer, diffraction grating, mirror, or lens, or the like. The substrate can contain polymeric materials, glass materials, ceramic materials, metal-containing materials (e.g., metals or metal oxides), or a combination thereof. Representative examples of polymeric materials include polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like. The substrate may be a reflective scattering element. Reflective scattering elements are ones that exhibit diffuse or semi-specular reflection. Diffuse and semi-specular reflections involve the reflection of light from a surface such that an incident ray is reflected at many angles rather than at just one angle as in specular reflection. A wide array of materials can be used to prepare reflective scattering elements, such as plaster, paper, fibrous materials such as cloth and non-woven fiber mats, inorganic filled reflective polymers, ceramic materials, crystalline surfaces, and voided polymeric materials. Examples of reflective scattering elements include graphics such as signs, markings or pictures; rough reflective surfaces of metals such as brushed aluminum and chrome; coated surfaces such as painted, printed, or ink-coated surfaces.

Examples of optically clear flexible substrates include a wide array of optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and antifingerprint films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings, anti-fingerprint coatings, antimicrobial coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. Examples of anti-fingerprint coatings include those described in U.S. Patent Application Ser. No. 61/486,000 filed May 13, 2011 titled: "COATING COMPOSITIONS COMPRISING NON-IONIC SURFACTANT EXHIBITING REDUCED FINGERPRINT VISIBILITY" which describes coatings prepared from a curable resin and a non-ionic surfactant. Examples of anti-microbial coatings include those described in U.S. Pat. No. 8,124,169 (Ylitalo et al.) which describe an antimicrobial coating system that includes a film-forming composition and an effective amount of an antimicrobial agent dispersed within the film-forming composition.

In certain embodiments, a coating can be added to the substrate to affect the optical properties of the substrate. An example of such a coating is a low refractive index coating. Examples of such coatings include those described in U.S. Pat. No. 7,374,812 (Mizuno) which describes silicone-modified fluoropolymers that are formed by first dissolving a fluoropolymer having at least one monomer of vinylidene fluoride coupled to a hexafluoropropylene monomer unit in an organic solvent and subsequently reacting the mixture with an amino silane coupling agent to form an aminosilane-modified fluoropolymer. The aminosilane fluoropolymer is subsequently heated and partially condensed with an oligomer of a silane compound including alkoxy silane. These silicone-modified fluoropolymers can be used to provide coatings that have a low refractive index. Coatings or substrates with low refractive index can be particularly useful with the self-wetting, optically clear pressure sensitive adhesive compositions described above, because, as described above, many embodiments of the adhesive compositions have high refractive indices. Therefore, a low refractive index layer can be adjacent to a high refractive index layer to give desirable optical properties such as anti-reflection.

Another class of low refractive index coatings that can be applied to a film or a substrate is porous coatings. These types of coatings are described in a series of patents: U.S. Pat. No. 5,585,186 (Scholz et al.); U.S. Pat. No. 5,873,931 (Scholz et al.); and U.S. Pat. No. 5,753,373 (Scholz et al.), which teach coatings with anti-reflective and anti-fogging properties. Each of these applications utilizes a porous inorganic metal oxide (such as, for example, silicon dioxide) in conjunction with an organic molecule or molecules. In U.S. Pat. No. 5,585,186 a silane or a siloxane oligomer is included, in U.S. Pat. No. 5,873,931 anionic surfactants are included, and in U.S. Pat. No. 5,753,373 polyhydroxy surfactants are included. In these references, the term "porous" refers to the presence of voids between the inorganic metal oxide particles created when the particles pack together. For single layer coatings, it is known that in order to maximize light transmission in air through an optically transparent substrate, and minimize reflection by the substrate, the refractive index of the coating should equal as closely as possible the square root of the refractive index of the substrate and the thickness of the coating should be one-fourth (¼) of the optical wavelength of the incident light. The voids in the coating provide a multiplicity of subwavelength interstices between the metal oxide particles where the refractive index (RI) abruptly changes from that of air (RI=1) to that of the metal oxide particles (e.g., for silica RI=1.44). By adjusting the porosity, a coating having a calculated refractive index (as shown in U.S. Pat. No. 4,816,333 (Lange, et al.)) very close to the square root of the refractive index of the substrate can be created. By utilizing coatings having optimal refractive indices, at coating thicknesses equal to approximately one-fourth the optical wavelength of the incident light, the percent transmission of light through the coated substrate is maximized and reflection is minimized. The voids in the coating are present substantially throughout; however, the coating may vary in density, e.g., the coating may become gradually more porous moving away from the substrate producing a gradient density. Such a gradient density enhances the anti-reflective property of the coating. Generally, the network has a porosity of about 25 to 45 volume percent, more typically about 30 to 40 volume percent, when dried. Porosity may be calculated from the refractive index of the coating according to published procedures such as in W. L. Bragg, A. B. Pippard, Acta Crystallographica, volume 6, page 865 (1953). When the metal oxide is silicon dioxide, this porosity provides a coating having a refractive index of 1.2 to 1.4, or even 1.25 to 1.36, which is approximately equal to the square root of the refractive indices of polyester, polycarbonate, or polymethyl methacrylate substrates. For example, a porous silica coating having a refractive index of 1.25 to 1.36 is capable of providing a highly anti-reflective surface when coated on a polyethylene terephthalate substrate (RI=1.64) at a thickness of 1000-1200 Angstroms.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

The FIGS. 2A, 3A, 4A, 5A and 6A show exemplary optical articles of this disclosure that contain two optical substrates. The FIGS. 2B, 3B, 4B, 5B and 6B show examples of the corresponding articles after heat de-bonding.

Figure 2A:
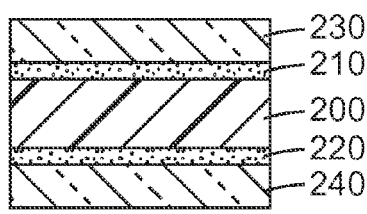
FIG. 2A shows a cross sectional view of a multi-layer optical article according to one embodiment of this disclosure.
Figure 2B:
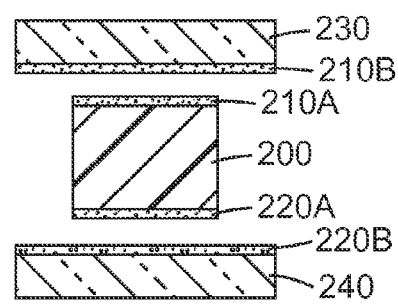
FIG. 2B shows a cross sectional view of the multi-layer optical article of 2A after heat shrinkage.

FIG. 2A shows an article comprising heat-shrinkable substrate 200 with optically clear adhesive layers 210 and 220 disposed thereon. Optical substrate 230 is adhered to optically clear adhesive layer 210 and optical substrate 240 is adhered to optically clear adhesive layer 220. Optical substrates 230 and 240 may be the same or different and one or both may be rigid or semi-rigid. Additionally, optical substrates 230 and 240 may be multi-layer substrates or they may contain coatings on one or both surfaces (not shown). FIG. 2B shows the article of FIG. 2A after heat de-bonding. In FIG. 2B the adhesive layers 210 and 220 have cohesively failed. This cohesive failure results in adhesive layer 210 remaining partially adhered to optical substrate 230 (as layer 210B in the figure) and partially adhered to the heat shrunk substrate 200 (as layer 210A in the figure). Similarly, adhesive layer 220 remains partially adhered to optical substrate 240 (as layer 220B in the figure) and partially adhered to the heat shrunk substrate 200 (as layer 220A in the figure).

Figure 3A:
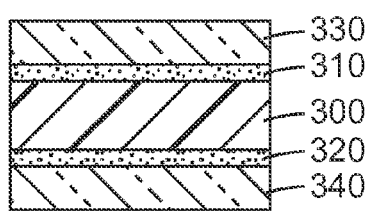
FIG. 3A shows a cross sectional view of a multi-layer optical article according to one embodiment of this disclosure.
Figure 3B:
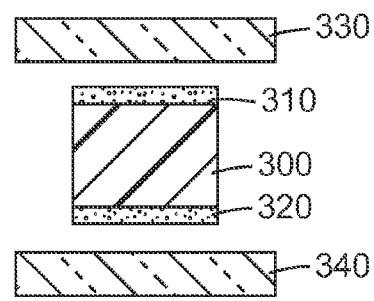
FIG. 3B shows a cross sectional view of the multi-layer optical article of 3A after heat shrinkage.

FIG. 3A shows an article comprising heat-shrinkable substrate 300 with optically clear adhesive layers 310 and 320 disposed thereon. Optical substrate 330 is adhered to optically clear adhesive layer 310 and optical substrate 340 is adhered to optically clear adhesive layer 320. Optical substrates 330 and 340 may be the same or different and one or both may be rigid or semi-rigid. Additionally, optical substrates 330 and 340 may be multi-layer substrates or they may contain coatings on one or both surfaces (not shown). FIG. 3B shows the article of FIG. 3A after heat de-bonding. In FIG. 3B the adhesive layers 310 and 320 have adhesively failed from optical substrates 330 and 340 respectively. This results in the adhesive layers 310 and 320 remaining adhered to the heat shrunk substrate 300.

Figure 4A:
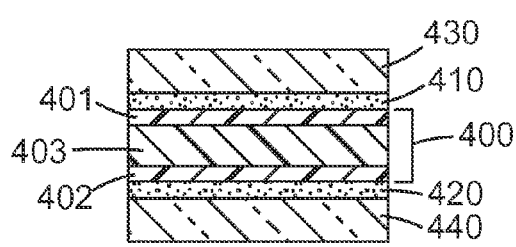
FIG. 4A shows a cross sectional view of a multi-layer optical article according to one embodiment of this disclosure.
Figure 4B:
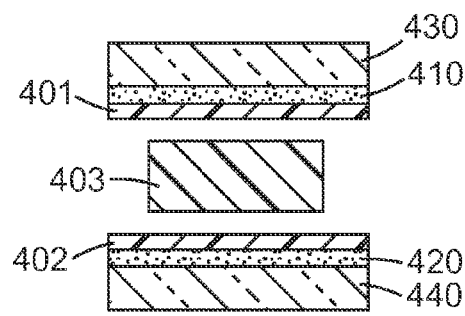
FIG. 4B shows a cross sectional view of the multi-layer optical article of 4A after heat shrinkage.

FIG. 4A shows an article comprising multi-layer heat-shrinkable substrate 400 with optically clear adhesive layers 410 and 420 disposed thereon. The multi-layer optically clear heat-shrinkable substrate comprises core layer 403 and sheathing layers 401 and 402. Sheathing layers 401 and 402 may be bonded to core layer 403 by a thin layer of adhesive (not shown) or may simply be laminated to core layer 403. In FIG. 4A the core layer 403 is heat-shrinkable but sheathing layers 401 and 402 are not heat-shrinkable but in some embodiments 401, 402 and 403 may all be heat-shrinkable. Optical substrate 430 is adhered to optically clear adhesive layer 410 and optical substrate 440 is adhered to optically clear adhesive layer 420. Optical substrates 430 and 440 may be the same or different and one or both may be rigid or semi-rigid. Additionally, optical substrates 430 and 440 may be multi-layer substrates or they may contain coatings on one or both surfaces (not shown). FIG. 4B shows the article of FIG. 4A after heat de-bonding. In FIG. 4B the sheathing layers 401 and 402 have remained adhered to the adhesive layers 410 and 420 and the adhesive layers 410 and 420 have remained adhered to optical substrates 430 and 440 respectively. This results in the detachment of sheathing layers 401 and 402 from the heat shrunk core layer 403.

Figure 5A:
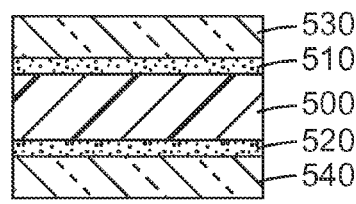
FIG. 5A shows a cross sectional view of a multi-layer optical article according to one embodiment of this disclosure.

FIG. 5A shows an article comprising heat-shrinkable substrate 500 with optically clear adhesive layers 510 and 520 disposed thereon. Optical substrate 530 is adhered to optically clear adhesive layer 510 and optical substrate 540 is adhered to optically clear adhesive layer 520. Optical substrates 530 and 540 may be the same or different and one or both may be rigid or semi-rigid.

Figure 5B:
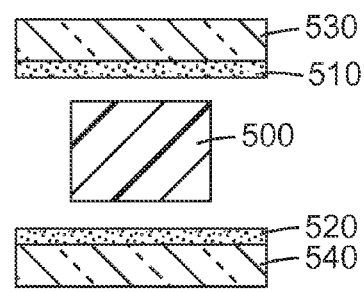
FIG. 5B shows a cross sectional view of the multi-layer optical article of 5A after heat shrinkage.

Additionally, optical substrates 530 and 540 may be multi-layer substrates or they may contain coatings on one or both surfaces (not shown). FIG. 5B shows the article of FIG. 5A after heat de-bonding. In FIG. 5B the adhesive layers 510 and 520 have remained adhered to optical substrates 530 and 540 respectively. This results in the adhesive layers 510 and 520 detaching from the heat shrunk substrate 500. This failure mode is indicative that the adhesive-optical substrate bond is stronger than the adhesive-heat-shrinkable substrate bond.

Figure 6A:
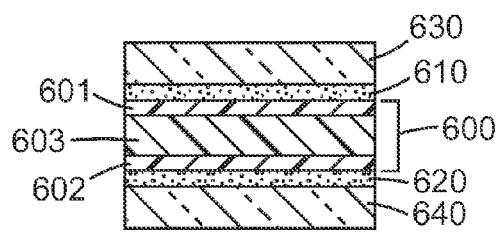
FIG. 6A shows a cross sectional view of a multi-layer optical article according to one embodiment of this disclosure.
Figure 6B:
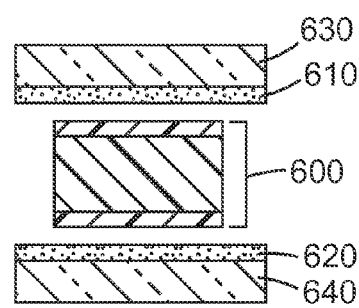
FIG. 6B shows a cross sectional view of the multi-layer optical article of 6A after heat shrinkage.

FIG. 6A shows an article comprising multi-layer heat-shrinkable substrate 600 with optically clear adhesive layers 610 and 620 disposed thereon. The multi-layer optically clear heat-shrinkable substrate comprises core layer 603 and coating layers 601 and 602. Coating layers 601 and 602 may be release coatings such as an LAB coating. Optical substrate 630 is adhered to optically clear adhesive layer 610 and optical substrate 640 is adhered to optically clear adhesive layer 620. Optical substrates 630 and 640 may be the same or different and one or both may be rigid or semi-rigid. Additionally, optical substrates 630 and 640 may be multi-layer substrates or they may contain coatings on one or both surfaces (not shown). FIG. 6B shows the article of FIG. 6A after heat de-bonding. In FIG. 6B the heat shrunk substrate 600 has remained intact. The adhesive layers 610 and 620 have detached from the heat shrunk substrate 600 and have remained adhered to optical substrates 630 and 640 respectively.

Also disclosed herein are articles comprising an optical substrate, an optically clear adhesive disposed on the optical substrate, and an optically clear heat-shrinkable substrate disposed on the optically clear adhesive. The optical substrates described above are also suitable for use in these articles. The optically clear heat-shrinkable substrates described above, including the desirable threshold shrink force values, are also suitable for these articles. Similarly, the optically clear adhesives described above are also suitable for these articles. However, for these articles, the range of Failure Forces that are suitable are considerable larger, being at least 0.1 grams per inch (0.0039 N/dm) and typically below 400 grams per inch (15.4 N/dm) or below 250 grams per inch (9.63 N/dm) or even below 235 grams per inch (9.05 N/dm). While the method for measuring the model Failure Force is the same, the range of Failure Forces suitable for use in articles which contain a single substrate are different from the Failure Forces suitable for use in articles with two substrates. While not wishing to be bound by theory, it is believed that since these articles comprise a heat-shrinkable substrate bonded to a substrate instead of a heat-shrinkable substrate bonded between two substrates that the requisite Failure Force values can be higher. Therefore, when the Failure Force model value is correlated with actual articles, it is observed that adhesives with higher Failure Force values still give the desired heat de-bonding in the actual articles.

In these articles, the optically clear heat-shrinkable substrate is functioning not as an intermediate layer in the multi-layer article, but as an exterior layer. As such, the optically clear heat-shrinkable substrate can be used to protect the optical substrate or can function as an "optical film" as described above. Thus, the optically clear heat-shrinkable substrate can have a variety of coatings present on the exterior surface (that is to say the surface opposite to the surface that is disposed on the optically clear adhesive).

Additionally, the optically clear heat-shrinkable substrate can be multi-layer article. At least a portion of the layers of the multi-layer article are heat-shrinkable as described above, and in some embodiments, all of the layers are heat-shrinkable.

As with the above described articles, the heat-shrinkability of the substrate permits for the de-bonding of the optically clear heat-shrinkable substrate from the optically clear article. This permits an easier, faster and less labor intensive process for disassembling of the formed articles, either at the end of service life or for some other reason, such as detection of a defect. All of the failure scenarios described above are also applicable to these articles. For example, the adhesive can fail cohesively or the adhesive-substrate bond can fail. Additionally, with multi-layer optically clear heat-shrinkable substrates, an exterior layer of the substrate can sacrificially remain attached to the adhesive layer. Also, the adhesive-heat shrinkable substrate bond can fail. As with the articles described previously, a mixture of these failure scenarios can occur.

Figure 7A:
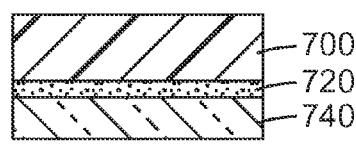
FIG. 7A shows a cross sectional view of a multi-layer optical article according to one embodiment of this disclosure.
Figure 7B:
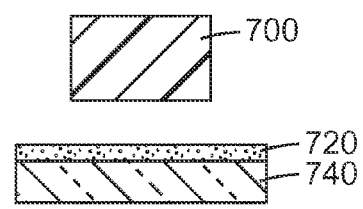
FIG. 7B shows a cross sectional view of the multi-layer optical article of 7A after heat shrinkage.
Figure 8A:
FIG. 8A shows a cross sectional view of a multi-layer optical article according to one embodiment of this disclosure.
Figure 8B:
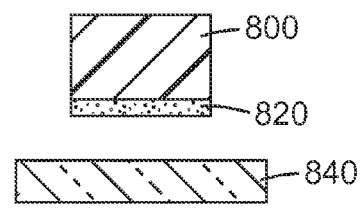
FIG. 8B shows a cross sectional view of the multi-layer optical article of 8A after heat shrinkage.

Exemplary articles containing one optical substrate are shown in FIGS. 7A and 8A and the corresponding heat shrunk articles are shown in FIGS. 7B and 8B. In FIG. 7A optically clear heat-shrinkable substrate 700 has optically clear adhesive 720 disposed on it. Optically clear heat-shrinkable substrate 700 may be a multi-layer substrate or may contain coatings on one or both surfaces (not shown). Optically clear adhesive 720 is adhered to optical substrate 740. Optical substrate 740 may be rigid or semi-rigid. Additionally, optical substrate 740 may be a multi-layer substrate or may contain coatings on one or both surfaces (not shown). FIG. 7B shows the article of FIG. 7A after heat de-bonding. Adhesive layer 720 has remained adhered to the optical substrate 740, resulting in the detachment of heat shrunk substrate 700 from the adhesive layer 720.

In FIG. 8A optically clear heat-shrinkable substrate 800 has optically clear adhesive 820 disposed on it. Optically clear heat-shrinkable substrate 800 may be a multi-layer substrate or may contain coatings on one or both surfaces (not shown). Optically clear adhesive 820 is adhered to optical substrate 840. Optical substrate 840 may be rigid or semi-rigid. Additionally, optical substrate 840 may be a multi-layer substrate or may contain coatings on one or both surfaces (not shown). FIG. 8B shows the article of FIG. 8A after heat de-bonding. Adhesive layer 820 has remained adhered to heat shrunk substrate 800, and has detached from optical substrate 840.

Also disclosed herein are methods of preparing adhesive articles, using the adhesive articles to prepare multi-layer optical articles, and methods of heat de-bonding the articles.

The adhesive articles described above are multi-layer articles comprising an optically clear heat-shrinkable substrate with two major surfaces and an optically clear adhesive disposed on each major surface. As described above the optically clear heat-shrinkable substrate may be a single layer substrate or it may be a multi-layer substrate. Single layer substrates may be a commercially available material such as a shrink film or it may be prepared from a film material by the appropriate application of heat and stretching. Multi-layer optically clear heat-shrinkable substrates may have all layers heat shrinkable or some layers that are not heat shrinkable. One particularly useful example of a multi-layer substrate suitable for use in this disclosure is a three layer film comprising a heat shrink film core layer with 2 non-shrinkable film sheath layers. The sheath layers may be laminated to the shrink film by direct lamination using pressure and/or heat or they may be adhesively laminated using either a very thin layer of pressure sensitive adhesive or a weakly adhering adhesive such as a gel adhesive (as described above). It is typically desirable that the sheath layers be weakly adhered to the core layer such that upon the application of heat and the generation of the shrink force in the core layer, the sheath layer-core layer bond breaks to leave the sheath layers adhered to the optically clear adhesive layers disposed on them. In other embodiments, the multi-layer optically clear heat-shrinkable substrate is a multi-layer film in which all layers are heat-shrinkable. These multi-layer films can be prepared by conventional multi-layer extrusion or lamination techniques. In still other embodiments, the multi-layer optically clear heat-shrinkable substrate comprises a heat shrink film core layer with coatings on the exterior surfaces. In some embodiments, these coatings are such that they weakly adhere to the core layer such that upon the application of heat and the generation of the shrink force in the core layer, the coating-core layer bonds break and the coatings adhere to the adhesive layer disposed on them. Such coatings include ones which have relatively high bond strength to the core layer at room temperature, but upon heating to the temperatures at which the heat-shrinkable core can shrink, the bond strength to the core diminishes. Examples of such coatings, include for example, hot melt types of materials. In this way, the coatings are similar to the sheath layers described above.

In other embodiments, the coatings are release coatings. These coatings are not designed to be removed from the core layer upon application of heat and the generation of the shrink force. Rather these coatings adhere relatively strongly to the core layer, but they produce a relatively weak bond between the core layer and the optically clear adhesive layers disposed on the coating surface of the core layer. These release coatings may be continuous or discontinuous. Examples of suitable release coating materials include LAB (Low Adhesion Backsize) materials used in tapes as described above.

Coatings applied to a heat-shrinkable film can be applied either simultaneously or sequentially using conventional coating techniques. The coatings can be applied as solvent-borne, water-borne, or 100% solids coatings. The coatings can be applied by any suitable process such as by, for example, knife coating, roll coating, gravure coating, rod coating, curtain coating, and air knife coating. The coatings may also be applied by printing techniques such as screen printing or inkjet printing. Coatings applied as 100% solids coatings may be applied by hot melt coating using an extruder or similar device provided that such coating does not cause sufficient heat transfer to the film to cause premature film shrinkage or heat setting of the film. Typically the coatings are relatively thin, typically 3-30 micrometers.

The optically clear adhesive layers can be disposed on the optically clear heat-shrinkable substrate either simultaneously or sequentially. Additionally, the adhesive layers can be coated onto the surface of the optically clear heat-shrinkable substrate, or the adhesive layers may be coated onto a release liner or similar substrate and laminated to the optically clear heat-shrinkable substrate. In some embodiments, particularly embodiments where the adhesive layer is hot melt coated or applied as a solvent-borne or water-borne coating and then dried by the application of heat, it may advantageous to coat the adhesive onto a release liner and then laminate to the optically clear heat-shrinkable substrate to avoid exposing the optically clear heat-shrinkable substrate to heat during coating. In the cases where the adhesive comprises a heat activated adhesive, the application of mild heat may be necessary during lamination to provide a strong film-adhesive bond.

The formed adhesive articles comprising a multi-layer construction of the type: first adhesive layer/heat-shrinkable substrate/second adhesive layer; is then used to prepare optical articles of the type described above. The method for preparing optical articles comprises providing an adhesive article as described above, disposing a first optical substrate to the first layer of optically clear adhesive and disposing a second optical substrate to the second layer of optically clear adhesive.

Typically the two optical substrates are disposed on the optically clear adhesive layers in a sequential manner. If both optical substrates are rigid or semi-rigid, this lamination can be complicated and fraught with difficulties such as the entrapment of air bubbles between the adhesive layer and substrate. A variety or techniques can be used to eliminate air entrapment such as the use of microstructured adhesive surfaces or by post-lamination process steps such as placing the formed article into an autoclave under pressure and heat to eliminate trapped air.

Microstructured adhesive layers can be prepared through the use of a microstructuring tool such as microstructured release liner. The microstructured pattern of the liner is pressed into the adhesive surface and upon removal of the liner a pattern that is the inverse of the microstructured pattern of the liner is left in the surface of the adhesive layer. This pattern is generally a series of microchannels. The microchannels can permit the adhesive layer to be contacted to a rigid or semi-rigid substrate without the entrapment of air because the entrapped air can escape the though the microchannels of the microstructured pattern. Typically the adhesive layer has enough ability to flow that upon the egress of air from the microchannels, the microchannels collapse and an air bubble free adhesive bond is formed.

After the optical article is formed, it may be desirable to de-bond the article. This de-bonding may be carried out immediately after the optical article is formed if it is detected that there is a defect in the optical article. A wide range of defects are possible and the ability to de-bond the article and remake the article can provide major cost and time savings. For example, if one of the optical substrates is the surface of an optical device and the defect is the entrapment of dust or some other contaminant that renders the optical device unusable, a quick de-bonding process and re-bonding to form a new device can prevent expensive components from being scrapped because of the defect.

The de-bonding may occur at a time far distant from the assembling of the multi-layer article, such as for example at the end of service life of the article. It may be desirable at that time to disassemble the article to recycle components, such as glass plates, rather than discarding the entire article.

The method of de-bonding comprises applying heat to the prepared multi-layer article sufficient to induce shrinkage in the heat-shrinkable substrate. This shrinkage, as has been described above, generates the shrinkage force that drives the de-bonding. Generally the heat applied is sufficient to generate the threshold shrink force but is not sufficient to degrade or damage other components of the article. The temperature and time at that temperature which are able to generate the threshold shrink force vary with different films. Typically the multi-layer articles are heated to 80 to 150° C. for a time of from 1 to 60 minutes, more typically 1-10 minutes. Generally when polyolefin films are used as the heat-shrinkable optical substrate, the articles are heated to 80 to 120° C. for a time of from 1 to 60 minutes, more typically 1-10 minutes. Generally when polyacrylate films are used as the heat-shrinkable optical substrate, the articles are heated to 100 to 150° C. for a time of from 1 to 60 minutes, more typically 1-10 minutes. However, temperatures and heating times can vary based, for example on the mass of the substrates involved, as well as other factors.

The shrink force causes the failure of the first optically clear adhesive layer and the second optically clear adhesive layer. As described above, the failure of the adhesive layer can be described by at least four failure mode scenarios: cohesive failure of the adhesive; adhesive failure of the adhesive against the optical substrate; peeling away of a layer of the heat-shrinkable substrate; or adhesive failure of the adhesive against the heat-shrinkable substrate. Combinations of failure mode scenarios are also possible. Examples of each type of failure mode are shown in the Figures.

After heat has been applied to cause the de-bonding, typically the multi-layer article is allowed to cool and the de-bonded article can then be disassembled and reusable parts cleaned or otherwise made ready to be reused or recycled. As mentioned previously, because the heat de-bonding mechanism is driven by the shrinkage of the heat-shrinkable substrate, a permanent change is made in the article by heating. This permanent change permits the article to be cooled and disassembled, the article need not be disassembled while hot.

This disclosure includes the following embodiments.

Among the embodiments are adhesive articles. A first embodiment comprises a first layer of optically clear adhesive with a first major surface and a second major surface; a heat-shrinkable optical substrate with a first major surface and a second major surface, wherein the first major surface of the heat-shrinkable substrate is disposed on the second major surface of the first layer of optically clear adhesive; and a second layer of optically clear adhesive with a first major surface and second major surface, wherein the first major surface of the second layer of optically clear adhesive is disposed on the second major surface of the heat-shrinkable substrate, wherein at least part of the heat-shrinkable substrate has a threshold shrink force of at least 100 grams per inch (3.85 N/dm), and the first adhesive layer and the second adhesive layer each has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising either the first adhesive layer and the heat shrinkable substrate or the second adhesive layer and the heat shrinkable substrate.

Embodiment 2 is the adhesive article of embodiment 1, wherein the Failure Force of the first adhesive layer comprises cohesive failure of the first adhesive layer, and the Failure Force of the second adhesive layer comprises cohesive failure of the second adhesive layer.

Embodiment 3 is the adhesive article of embodiment 1, wherein the Failure Force of the first adhesive layer comprises adhesive failure of the first adhesive layer to the glass substrate, and the Failure Force of the second adhesive layer comprises adhesive failure of the second adhesive layer to the glass substrate.

Embodiment 4 is the adhesive article of embodiment 1, wherein the heat-shrinkable optical substrate comprises a multi-layer substrate and wherein the Failure Force of the first adhesive layer comprises the peeling away of some layers of the multi-layer substrate and the retention of at least one layer of the multi-layer substrate to the first adhesive layer, and the Failure Force of the second adhesive layer comprises the peeling away of some layers of the multi-layer substrate and the retention of at least one layer of the multi-layer substrate to the second adhesive layer.

Embodiment 5 is the adhesive article of embodiment 1, wherein the Failure Force of the first adhesive layer and the Failure Force of the second adhesive layer comprises peeling away of the heat-shrinkable optical substrate from the adhesive layer.

Embodiment 6 is the adhesive article of any of embodiments 1-5, further comprising a release liner disposed on the first major surface of the first layer of optically clear adhesive and a release liner disposed on the second major surface of the second layer of optically clear adhesive.

Embodiment 7 is the adhesive article of any of embodiments 1-6, wherein at least one of the first layer of optically clear adhesive and the second layer of optically clear adhesive comprises a pressure sensitive adhesive.

Embodiment 8 is the adhesive article of any of embodiments 1-7, wherein both the first layer of optically clear adhesive and the second layer of optically clear adhesive comprise pressure sensitive adhesives.

Embodiment 9 is the adhesive article of any of embodiments 7-8, wherein the pressure sensitive adhesive comprises a (meth)acrylate-based pressure sensitive adhesive.

Embodiment 10 is the adhesive article of any of embodiments 1-5, wherein at least one of the first layer of optically clear adhesive and the second layer of optically clear adhesive comprises a gel, a cured adhesive, or a hot melt adhesive.

Embodiment 11 is the adhesive article of any of embodiments 1-10, wherein the heat-shrinkable substrate comprises a film comprising a polyolefin film, a poly(meth)acrylate film, a polyester film, a polystyrene film, a polycarbonate film, a vinyl film, a cellulose-based film, or a blend film.

Embodiment 12 is the adhesive article of any of embodiments 1-11, wherein the heat-shrinkable substrate has an initial area at ambient temperature and shrinks to no greater than 80% of the initial area upon exposure to 150° C. for 30 minutes.

Embodiment 13 is the adhesive article of embodiment 4, wherein not all layers of the multi-layer film are heat-shrinkable.

Among the embodiments are optical articles. Embodiment 14 is an article comprising: a first optical substrate with a first major surface and a second major surface; a first layer of optically clear adhesive with a first major surface and a second major surface, wherein the first major surface of the first layer of optically clear adhesive is disposed on the second major surface of the first optical substrate; a heat-shrinkable optical substrate with a first major surface and a second major surface, wherein the first major surface of the heat-shrinkable substrate is disposed on the second major surface of the first layer of optically clear adhesive; a second layer of optically clear adhesive with a first major surface and second major surface, wherein the first major surface of the second layer of optically clear adhesive is disposed on the second major surface of the heat-shrinkable substrate; and a second optical substrate with a first major surface and a second major surface, wherein the first major surface of the second optical substrate is disposed on the second major surface of the second layer of optically clear adhesive; and wherein at least part of the heat-shrinkable substrate has a threshold shrink force of at least 100 grams per inch (3.85 N/dm), and the first adhesive layer and the second adhesive layer each has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising either the first adhesive layer and the heat shrinkable substrate or the second adhesive layer and the heat shrinkable substrate.

Embodiment 15 is the article of embodiment 14, wherein at least one of the first optical substrate and the second optical substrate comprises a rigid or semi-rigid substrate.

Embodiment 16 is the article of embodiment 14 or 15, wherein the first optical substrate comprises a semi-rigid substrate with a thickness of from 25-100 micrometers thickness.

Embodiment 17 is the article of any of embodiments 14-16, wherein both the first optical substrate and the second optical substrate comprise rigid or semi-rigid substrates.

Embodiment 18 is the article of embodiment 14, wherein the first optical substrate comprises a rigid or semi-rigid substrate and the second optical substrate comprises a flexible substrate.

Embodiment 19 is the article of any of embodiments 14-18, wherein at least one of the first layer of optically clear adhesive and the second layer of optically clear adhesive comprise a pressure sensitive adhesive.

Embodiment 20 is the article of any of embodiments 14-19, wherein both the first layer of optically clear adhesive and the second layer of optically clear adhesive comprise pressure sensitive adhesives.

Embodiment 21 is the article of any of embodiments 19-20, wherein the pressure sensitive adhesive comprises a (meth)acrylate-based pressure sensitive adhesive.

Embodiment 22 is the article of any of embodiments 14-19, wherein at least one of the first layer of optically clear adhesive and the second layer of optically clear adhesive comprise a gel, a cured adhesive, or a hot melt.

Embodiment 23 is the article of any of embodiments 14-22, wherein the heat-shrinkable substrate comprises a film comprising a polyolefin film, a poly(meth)acrylate film, a polyester film, a polystyrene film, a polycarbonate film, a vinyl film, a cellulose-based film, or a blend film.

Embodiment 24 is the article of any of embodiments 14-23, wherein the heat-shrinkable substrate has an initial area at ambient temperature and shrinks to no greater than 80% of the initial area upon exposure to 150° C. for 30 minutes.

Embodiment 25 is the article of any of embodiments 14-24, wherein the heat-shrinkable substrate comprises a multi-layer film.

Embodiment 26 is the article of embodiment 25, wherein not all layers of the multi-layer film are heat-shrinkable.

Embodiment 27 is an article comprising: a first optical substrate with a first major surface and a second major surface; a first layer of optically clear adhesive with a first major surface and a second major surface, wherein the first major surface of the first layer of optically clear adhesive is disposed on the second major surface of the first optical substrate; and a heat-shrinkable optical substrate with a first major surface and a second major surface, wherein the first major surface of the heat-shrinkable optical substrate is disposed on the second major surface of the first layer of optically clear adhesive; wherein at least part of the heat-shrinkable substrate has a threshold shrink force of at least 100 grams per inch (3.85 N/dm), and the first adhesive layer has a Failure Force of from 0.1 to 400 grams per inch (0.039-15.4 N/dm), where the Failure Force is determined by measuring either the 90° Peel Adhesion at room temperature or the 180° Peel Adhesion at 100° C. to a glass substrate of an article comprising the first adhesive layer and the heat shrinkable optical substrate.

Embodiment 28 is the article of embodiment 27, wherein the optically clear heat-shrinkable substrate further comprises a coating.

Embodiment 29 is the article of embodiment 28, wherein the coating comprises a hardcoat, an anti-reflective coating, and anti-glare coating, a soil resistant coating, an anti-fingerprint coating, an anti-fog coating, an anti-scratch coating, a privacy coating, an anti-microbial coating, or a combination thereof.

Embodiment 30 is the article of any of embodiments 27-29, wherein the first optical substrate comprises a rigid or semi-rigid substrate.

Embodiment 31 is the article of any of embodiments 27-30, wherein the heat-shrinkable substrate comprises a film comprising a polyolefin film, a poly(meth)acrylate film, a polyester film, a polystyrene film, a polycarbonate film, a vinyl film, a cellulose-based film, or a blend film.

Among the embodiments are methods. Embodiment 32 is a method comprising: preparing a multi-layer article, wherein preparing the multi-layer article comprises: providing an adhesive article, the adhesive article comprising: a first layer of optically clear adhesive with a first major surface and a second major surface; a heat-shrinkable optical substrate with a first major surface and a second major surface, wherein the first major surface of the heat-shrinkable substrate is disposed on the second major surface of the first layer of optically clear adhesive; and a second layer of optically clear adhesive with a first major surface and second major surface, wherein the first major surface of the second layer of optically clear adhesive is disposed on the second major surface of the heat-shrinkable substrate, wherein at least part of the heat-shrinkable substrate has a threshold shrink force of at least 100 grams per inch (3.85 N/dm), and the first adhesive layer and the second adhesive layer each has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising either the first adhesive layer and the heat shrinkable substrate or the second adhesive layer and the heat shrinkable substrate; disposing a first optical substrate to the first major surface of the first layer of optically clear adhesive; and disposing a second optical substrate to the second major surface of the second layer of optically clear adhesive.

Embodiment 33 is the method of embodiment 32, wherein at least one of the first optical substrate and the second optical substrate comprises a rigid or semi-rigid substrate.

Embodiment 34 is the method of embodiment 32 or 33, wherein first optical substrate comprises a semi-rigid substrate with a thickness of from 25-100 micrometers thickness.

Embodiment 35 is the method of any of embodiments 32-34, wherein both the first optical substrate and the second optical substrate comprise rigid or semi-rigid substrates.

Embodiment 36 is the method of any of embodiments 32-35, wherein the first optical substrate comprises a rigid or semi-rigid substrate and the second optical substrate comprises a flexible substrate.

Embodiment 37 is the method of any of embodiments 32-36, wherein at least one of the first layer of optically clear adhesive and the second layer of optically clear adhesive comprise a pressure sensitive adhesive.

Embodiment 38 is the method of any of embodiments 32-37, wherein both the first layer of optically clear adhesive and the second layer of optically clear adhesive comprise pressure sensitive adhesives.

Embodiment 39 is the method of embodiment 37 or 38, wherein the pressure sensitive adhesive comprises a (meth)acrylate-based pressure sensitive adhesive.

Embodiment 40 is the method of any of embodiments 32-37, wherein at least one of the first layer of optically clear adhesive and the second layer of optically clear adhesive comprise a gel, a cured adhesive, or a hot melt.

Embodiment 41 is the method of any of embodiments 32-40, wherein the heat-shrinkable substrate comprises a film comprising a polyolefin film, a poly(meth)acrylate film, a polyester film, a polystyrene film, a polycarbonate film, a vinyl film, a cellulose-based film, or a blend film. Embodiment 42 is the method of any of embodiments 32-41, wherein the heat-shrinkable substrate has an initial area at ambient temperature and shrinks to no greater than 80% of the initial area upon exposure to 150° C. for 30 minutes.

Embodiment 43 is the method of any of embodiments 32-42, wherein the heat-shrinkable substrate comprises a multi-layer film.

Embodiment 44 is the method of embodiment 43, wherein not all layers of the multi-layer film are heat-shrinkable.

Embodiment 45 is the method of any of embodiments 32-44, further comprising applying heat to the prepared multi-layer article sufficient to induce shrinkage in the heat-shrinkable substrate.

Embodiment 46 is the method of embodiment 45, wherein the shrinkage causes failure of the first optically clear adhesive layer and the second optically clear adhesive layer.

Embodiment 47 is the method of embodiment 46, wherein the failure mode of at least one the first optically clear adhesive layer or the second optically clear adhesive layer comprises cohesive failure of the adhesive layer.

Embodiment 48 is the method of embodiment 46, wherein the failure mode of at least one of the first optically clear adhesive layer or the second optically clear adhesive layer comprises adhesive failure at the adhesive layer-optical substrate interface.

Embodiment 49 is the method of embodiment 46, wherein the heat shrinkable substrate comprises a multi-layer substrate, and wherein the failure mode of at least one of the first optically clear adhesive layer or the second optically clear adhesive layer comprises peeling away of a layer of the multi-layer heat shrinkable substrate from the remaining layers of the multi-layer heat shrinkable substrate.

Embodiment 50 is the method of embodiment 46, wherein the failure mode of at least one of the first optically clear adhesive layer or the second optically clear adhesive layer comprises adhesive failure at the adhesive layer-heat shrinkable substrate interface.

Examples

These examples are merely for illustrative purposes only and are not meant to be limiting on the scope of the appended claims. All parts, percentages, ratios, etc. in the examples and the rest of the specification are by weight, unless noted otherwise.

Materials:

| Abbreviation | Description |
| --- | --- |
| Shrink Film 1 | Polyolefin Shrink Box Film #1525, 50.8 micrometers thickness, available from Bemis Clysar Films, Oshkosh, WI. |
| Shrink Film 2 | Clear Acrylic PMMA film 0333, 76.2 micrometers thickness, prepared as described in U.S. Pat. No. 4,637,950 |
| Shrink Film 3 | MELINEX Polyethylene terephthalate (PET) film #7132, 20.3 micrometers thickness, available from Dupont Teijin Films, Hopewell, VA. |
| Shrink Film 4 | Shrink Film 2 with easy release coating as described below |
| Shrink Film 5 | Shrink Film 2 with tight release coating as described below |
| IPM | Isopropyl Myristate (Liponate IPM) available from Lipo Chemicals, Paterson, NJ. |
| Oligomer 1 | Urethane acrylate oligomer commercially available from Sartomer Company, Exton, PA as "CN 9018". |
| Oligomer 2 | Aliphatic urethane acrylate commercially available from Sartomer Company, Exton, PA as "CN 9002". |
| Monomer 1 | Ethoxylated pentaerythritol tetraacrylate commercially available from Sartomer Company, Exton, PA as "SR494". |
| Monomer 2 | Alkoxylated neopentyl glycol diacrylate commercially available from Sartomer Company, Exton, PA as "SR9045". |
| Monomer 3 | 2 (2-ethoxyethoxy) ethyl acrylate diacrylate commercially available from Sartomer Company, Exton, PA as "SR256". |
| Photoinitiator 1 | Photoinitiator commercially available from Ciba/BASF, Hawthorne, NY as "DAROCUR 4265". |
| Transfer PSA 1 | Si-modified optically clear adhesive transfer tape, 25 micrometers in thickness, prepared as described in PCT Publication No. WO 2009/105297. |
| Transfer PSA 2 | An optically clear double coat transfer tape w/isooctyl acrylate (IOA)/acrylic acid (AA) (93/7), 25 micrometers in thickness, as described in U.S. Pat. No. RE24,906 (Ulrich) on one side of 25 micrometer PET, and 40% MAcEPE/60% isooctyl acrylate (IOA)/acrylic acid (AA) (93/7), 25 micrometers in thickness, on the other side of the 25 micrometer PET, MAcEPE is described in PCT Publication No. WO 2009/085662. |
| Transfer PSA 3 | Optically clear adhesive transfer tape, 8171, 25 micrometer thickness, available from 3M Company, St. Paul, MN, |
| Gel Adh 1 | Silicone Gel Adhesive commercially available from Nye Optical, Fairhaven, MA as "SmartGel OCK 451". |
| Film 1 | Thermoplastic Polyurethane film, 500 micrometers in thickness, commercially available from Huntsman, Derry, NH as "Krystalflex PE399". |
| Hot Melt | Hot Melt Glue commercially available from FPC Corporation, Wauconda, IL, as Surebonder All-Purpose Stik Mini Glue Sticks. |
| Semi-Rigid Substrate 1 | Semi-Rigid Glass, available as D263 Teco 100 micrometer Ultra-Thin Glass from Schott North America Inc, Duryea, PA |

| PSA Formulation Table | |
| --- | --- |
| Formulation | Components (initial % by total solids) |
| PSA 1 | Oligomer 1/Oligomer 2/Monomer 1/Monomer 2 (40/35/15/10) + 1% Photoinitiator 1 |
| PSA 2 | Oligomer 1/Monomer 2 (60/40) + 1% Photoinitiator 1 |
| PSA 3 | Oligomer 1/Monomer 2 (75/25) + 1% Photoinitiator 1 |
| PSA 4 | Oligomer 1/IPM (70/30) + 1% Photoinitiator 1 |
| PSA 5 | Oligomer 1/Monomer 3/Monomer 2 (75/20/5) + 1% Photoinitiator 1 |
| PSA 6 | Oligomer 1/Monomer 3/Monomer 2 (60/30/10) + 1% Photoinitiator 1 |
| PSA 7 | Oligomer 1/Monomer 3/Monomer 2 (67.5/25/7.5) + 1% Photoinitiator 1 |
| PSA 8 | 60/3/37 butyl acrylate/acrylic acid/2-biphenyloxy ethyl acrylate with 0.3% isooctyl thioglycolate as prepared in US Patent Publication No. 2010/0048804 |
| PSA 9 | 52/3/45 isooctyl acrylate/acrylic acid/2-biphenyloxy ethyl acrylate as prepared in USPatent Publication No. 2010/0048804 plus a 30% addition by solids weight of IPM |
| PSA 10 | 98/2 isooctyl acrylate/acrylic acid as prepared in U.S. Pat. No. RE24906 |

Test Methods

Shrink Force

Shrink force tests were conducted by adapting the method in ASTM D2838-90 (1980), Procedure A, to be done using a Q800 DMA instrument (TA Instruments, New Castle, Del.) equipped with film tension grips in iso-strain mode. Test specimens with a width of 6.3 mm (0.25 in) were cut from a larger piece of shrink film in an orientation parallel to either the machine direction or the transverse direction. The strips were mounted in the DMA grips with an initial grip separation between 24 mm and 25 mm. Below 30° C., the sample was stretched slightly to a strain level between 0.005% and 0.05%, and that length was maintained as the temperature was increased at a rate of 3° C./min. The force required to maintain the constant length was recorded until the shrink force had passed through a maximum. Tests were conducted with samples from both the machine direction and the transverse direction, and the maximum force observed in those two tests was divided by the width of the test sample to calculate the shrink force. The temperature at which the maximum shrink force was observed was also reported.

Peel Force

90° Peel Adhesion

90° Peel Adhesion tests were conducted by adapting the method in ASTM D3330-90. Adhesive coatings were cut to 2.54 centimeter by 15 centimeter strips. Each strip was then adhered to a 6.2 centimeter by 23 centimeter clean, solvent washed glass panel using a 2-kilogram roller passed once over the strip. The bonded assembly dwelled at room temperature for no less than 10 minutes and no more than 15 minutes. The samples were tested for 90° peel adhesion using an IMASS slip/peel tester with a 90° peel testing assembly (Model SP2000, commercially available from Instrumentors Inc., Strongsville, Ohio) at a rate of 2.3 meters/minute (90 inches/minute) over a five second data collection time. Three samples were tested; the reported peel adhesion value is an average of the peel adhesion value from each of the three samples. Data was measured in grams/inch width and converted to Newtons per decimeter (N/dm).

180° High Temp Peel (100° C.)

This peel adhesion test is similar to the test method described in ASTM D 3330-90, substituting a glass substrate (15.2 cm×2.7 cm×0.3 cm) for the stainless steel substrate described in the standard. Adhesive coatings on PET film were cut into strips 25.4 centimeters wide and between 15 cm 20 cm long. Each strip was then adhered to a clean, solvent washed glass coupon using a 2-kilogram roller passed twice over the strip. The bonded assembly dwelled at room temperature for at least 18 hours. One end of the adhesive-coated PET film was peeled off the glass a distance of 2.5 cm, and each face of this tab was attached to pieces of polyester tape (3M tape 8403, available from 3M Company, St. Paul, Minn.) 2.5 cm wide and 20 cm long. The 2.5 cm section of uncovered glass substrate was loaded into the bottom grip of a SINTECH load frame (commercially available from MTS Systems Corporation, Eden Prairie, Minn.) within an environmental chamber at 100° C. The polyester tape was placed in the top grip of the load frame. The sample was left in the environmental chamber for three minutes to equilibrate, and was then tested for 180° Peel Adhesion at a rate of 30.5 cm/minute for a total peel distance of at least 12 cm. The peel value was calculated by averaging the loads that were observed over the peel distances between 2.5 cm and 7.5 cm. Three specimens were tested for each adhesive, and the average peel value for the three specimens is reported.

Transmission and Haze Measurements

Transmission and haze values were obtained for samples using a Haze-Gard Plus, made by BYK Gardner USA, Columbia, Md. Liner(s) film was removed from the adhesive sample just prior to measurement. Samples were held in front of the HT port of the Haze-Gard Plus. Test button was pushed, and % haze and % transmission values were recorded.

Shrink-Off Test Method

Thermocouple end was attached to the backside of the bottom glass slide of a glass slide sandwich with high temperature tape. The glass slide sandwich was placed on a metal rack to raise off the bench top. Using a conventional heat gun (for example; Master Heat Gun, Model HG301A, Master Appliance Corp., Racine Wis.), heat was applied by slowly moving over the surface of the top glass slide. Heat was applied to the sample until the film in the PSA/Film construction had visibly shrunk enough to separate the two glass sides. The temperature of the backside glass surface was recorded. The construction was cooled sufficiently to handle, and if glass slides separated then the sample was designated as "yes". Glass slides were able to be separated with finger pull only, no prying or wedging with an implement. If sufficient film shrinkage had not occurred to initiate separation of glass slides, and backside glass temperature reached 175° C., the test was terminated. If glass slides could not be separated by fingers alone or backside glass temp exceeded 175° C. without significant film shrinkage, the sample was designated as "no".

EXAMPLES

Shrink Force

The shrink force of the shrink films was determined by following the Shrink Force test procedure and results are shown in Table 1.

TABLE 1

| Shrink Film | Shrink Force (N/dm) | Temp at max shrink (° C.) |
|---|---|---|
| Shrink Film 1 | 16.6 | 99 |
| Shrink Film 2 | 5.33 | 114 |
| Shrink Film 3 | 9.66 | 69 |

Rigid to Rigid Substrates: PSA to Glass Interface Failure Examples

Formulation and Sample Preparation

PSA formulations were prepared using the following procedure. Components were added to each mixture in the solids weight percentages specified in the PSA formulation table. Bottles of the mixtures were rolled on a roller mixer for 1 hour. Mixing was done at room temperature.

The resultant mixtures were cast onto shrink film (as specified in table 2) to form a PSA/Film/PSA construction. Release liner, PSA formulation, shrink film, PSA formulation, release liner were placed in a marble top knife coater, which was gapped to yield 50-75 micrometers of coating on each side. The multi-layer construction was pulled under the knife die to spread the PSA formulation to the prescribed thickness on each side of the base film. The resulting construction was UV cured with 2 passes at 23 m/min at 100% power using a Fusion F600 high intensity UV lamp (D bulb) from Fusion UV Systems Inc, Gaithersburg. Samples where the PSA is a transfer tape were made by simple hand lamination of transfer tape to each side of the shrink film.

Optical properties and Failure Force from glass were measured for each sample. PSA/Shrink Film/PSA constructions were tested for Failure Force using the 90° Peel Adhesion test method described above and optical properties were measured using the Transmission and Haze measurements test method described above. Results are reported in Table 2.

Heat separation evaluations of the samples were also performed. The PSA/Shrink Film/PSA constructions were laminated between two 50 mm×75 mm×1 mm glass slides. Lamination wet-out area of 80% minimum of the 50 mm×75 mm area was required for a valid sample. If the initial lamination did not satisfy 80% minimum area wet out, then a new lamination was made.

Shrink-Off tests were carried out using the test method described above. The results are shown in table 2.

TABLE 2

PSA to Glass Substrate Interface Failure

| PSA Description | Failure Force (N/dm) | Shrink Film Type | Separated Glass | Back Side Temp (° C.) | Transmission (%) | Haze (%) |
|---|---|---|---|---|---|---|
| PSA 1 | 1.32 | Shrink Film 2 | yes | na | Na | Na |
| PSA 1 | 1.32 | Shrink Film 1 | yes | na | Na | Na |
| Transfer PSA 3 | 46.3 | Shrink Film 2 | no | na | 94.2 | 2.53 |
| Transfer PSA 3 | 46.3 | Shrink Film 1 | no | na | 92.1 | 3.03 |
| PSA 2 | 0.64 | Shrink Film 2 | yes | na | 95.7 | 0.80 |
| PSA 3 | 1.70 | Shrink Film 2 | yes | 145 | 95.7 | 0.79 |
| PSA 4 | 1.13 | Shrink Film 2 | yes | 140 | Na | Na |
| PSA 2 | 0.64 | Shrink Film 1 | yes | 115 | 94.6 | 2.07 |
| PSA 3 | 1.70 | Shrink Film 1 | yes | 120 | 94.2 | 1.89 |
| PSA 4 | 1.13 | Shrink Film 1 | yes | 121 | Na | Na |
| PSA 5 | 8.97 | Shrink Film 2 | no | 175 | 94.5 | 0.73 |
| PSA 6 | 3.22 | Shrink Film 2 | no | 175 | 95.8 | 0.71 |
| PSA 7 | 3.85 | Shrink Film 2 | no | 175 | 95.8 | 0.66 |
| PSA 5 | 8.97 | Shrink Film 1 | no | 175 | 94.9 | 1.80 |
| PSA 6 | 3.22 | Shrink Film 1 | yes | 129 | 94.9 | 1.80 |
| PSA 7 | 3.85 | Shrink Film 1 | no | 175 | 91.4 | 2.44 |
| PSA 3 | 1.70 | Shrink Film 3 | yes | 160 | 95.1 | 2.24 |
| PSA 6 | 3.22 | Shrink Film 3 | no | 175 | 94.3 | 2.24 |

Rigid to Rigid Substrates: PSA to Film Interface Failure Examples

Sample Preparation

Shrink Film 4 was prepared by applying an easy release coating to Shrink Film 2. This coating consisted of 3.6 g of Gelest Dimethyl Siloxane S12+0.4 g of Gelest SIB 1824 (both from Gelest Inc, Morrisville, Pa.)+0.08 g of an onium salt photo catalyst (for example UV9380C from Momentive Performance Materials, Columbus, Ohio) in 20.4 g Heptane and 5.1 g Methyl ethyl ketone. The coating solution was prepared as described in U.S. Pat. No. 6,204,350. The solution was coated on Shrink Film 2 with #4 wire wound rod (RD Specialists Inc, Webster, N.Y.) to yield a dry thickness of about 9 micrometers. The coated film was placed in 50° C. oven for 30 seconds to dry. Then the coated film was UV cured at 12 m/min using a Fusion 300 watt/in high intensity UV lamp (H bulb) from Fusion UV Systems Inc, Gaithersburg, Md.

Shrink Film 5 was prepared by applying a tight release coating to Shrink Film 2. This coating consisted of a 2% by weight solution of a non-silicone release material as described in U.S. Pat. No. 6,660,354 in a 1:1 solvent mix of Toluene and Methyl Ethyl Ketone. The solution was prepared as described in U.S. Pat. No. 6,660,354. The solution was coated on Shrink Film 2 with #4 wire wound rod (RD Specialists Inc, Webster, N.Y.) to yield a dry thickness of about 9 micrometers. The coated film was placed in 50° C. oven for 30 seconds to dry. Then the coated film was UV cured at 12 m/min using a Fusion 300 watt/in high intensity UV lamp (H bulb) from Fusion UV Systems Inc, Gaithersburg, Md.

PSA transfer tapes were laminated to each side of the shrink films listed in Table 3.

Optical properties and Failure Force from shrink film were measured for each sample. PSA/Shrink Film/PSA constructions were tested for Failure Force using the 90° Peel Adhesion test method described above and optical properties were measured using the Transmission and Haze measurements test method described above. Results are reported in Table 3.

Heat separation evaluations of the samples were also performed. The PSA/Shrink Film/PSA constructions were laminated between two 50 mm×75 mm×1 mm glass slides. Lamination wet-out area of 80% minimum of the 50 mm×75 mm area was required for a valid sample. If the initial lamination did not satisfy 80% minimum area wet out, a new lamination was made.

Shrink-Off tests were carried out using the test method described above. The results are shown in Table 3.

TABLE 3

PSA to Film Interface Failure

| PSA (Transfer Tape) Description | Failure Force (N/dm) | Shrink Film Type | Separated Glass | Back Side Temp (° C.) | Transmission (%) | Haze (%) |
|---|---|---|---|---|---|---|
| Transfer PSA 1 | 1.21 | Shrink Film 1 | yes | 155 | 91.5 | 3.91 |
| Transfer PSA 3 | 3.73 | Shrink Film 1 | no | 175 | 92.1 | 3.03 |
| Transfer PSA 2 | 3.07 | Shrink Film 1 | no | 175 | 92.7 | 3.57 |
| Transfer PSA 3 | 0.06 | Shrink Film 4 | yes | 120 | 92.3 | 1.91 |
| Transfer PSA 1 | 0.02 | Shrink Film 4 | yes | 120 | 92.3 | 2.82 |
| Transfer PSA 2 | 0.04 | Shrink Film 4 | yes | 115 | 91.3 | 4.79 |
| Transfer PSA 3 | 1.25 | Shrink Film 5 | no | 175 | 92.4 | 2.11 |
| Transfer PSA 1 | 0.97 | Shrink Film 5 | yes | 135 | 91.8 | 4.23 |
| Transfer PSA 2 | 0.39 | Shrink Film 5 | yes | 125 | 91.0 | 3.09 |

Rigid to Rigid Substrates: Cohesive Adhesive Failure Examples

Sample Preparation

The hot melt sample was prepared by dispensing the Hot Melt onto a release liner with a Surebonder GM-160C Mini-Glue Gun (available from FPC Corporation, Wauconda, Ill.), and placing a second release liner on top of the Hot Melt. Liner/Hot Melt/liner was then run through a heated nip laminator at a temperature of 107° C. to obtain a thickness of approximately 40 micrometers. This material was cut into two pieces, one liner was removed from each and hand laminated at room temperature to each side of Shrink Film 2.

The PSA's listed in Table 4 were coated onto shrink film to form a PSA/Film/PSA constructions. PSA/Film/PSA constructions were prepared by sequentially coating solvent diluted polymer solution on each side of the base film and then drying. Solution and film were placed on a marble top knife coater. The knife die was gapped to yield 50-75 micrometers of dried coating. Solution and film were pulled under the knife die to spread the solution to the prescribed wet thickness on the film. The coating was then dried at 70° C. for 10 minutes yielding the desired dry thickness of PSA. Si coated release liner was then laminated to the exposed side of the coated PSA. The process was repeated to coat the other side of the base film.

Optical properties and Failure Force were measured for each sample. PSA/Shrink Film/PSA constructions were tested for Failure Force using the High Temp Peel 100° C. test method described above and optical properties were measured using the Transmission and Haze measurements test method described above. Results are reported in Table 4.

Heat separation evaluations of the samples were also performed. Shrink-Off tests were carried out using the test method described above. The results are shown in Table 4.

TABLE 4

Cohesive Adhesive Failure

| Adhesive Description | Cohesive Failure Force (N/dm) | Shrink Film Type | Separated Glass | Back Side Temp (° C.) | Transmission (%) | Haze (%) |
|---|---|---|---|---|---|---|
| Hot Melt | 0.91 | Shrink Film 2 | Yes | 125 | 83.4 | 2.59 |
| PSA 8 | 1.17 | Shrink Film 2 | Yes | na | 90.4 | 3.87 |
| PSA 9 | 0.82 | Shrink Film 2 | Yes | na | 90.9 | 0.37 |
| PSA 10 | 7.19 | Shrink Film 2 | No | na | 90.7 | 2.80 |

Rigid to Rigid Substrates: Multi-Layer Film Interfacial Failure Examples

Sample Preparation

Film 1 was heat pressed at 100 deg C. to a thickness of 125 micrometers. This film was then heat laminated, through a 50 deg C. nip, to each side of Shrink Film 1. Transfer PSA 3 was then laminated to both exposed surfaces of Film 1.

Optical properties and Failure Force were measured using the 90° Peel Adhesion test method described above. Results are reported in Table 5.

Heat separation evaluation of the sample was also performed. The PSA/Film/Film/Film/PSA construction was laminated between two 50 mm×75 mm×1 mm glass slides. Lamination wet-out area of 80% minimum of the 50 mm×75 mm area was required for a valid sample. If the initial lamination did not satisfy 80% minimum area wet out, a new lamination was made.

Shrink-Off test was carried out using the test method described above. The results are shown in Table 5.

TABLE 5

Multi-Layer Film Interfacial Failure

| Multilayer film/ PSA construction description | Failure Force (N/dm) | PSA Type | Separated Glass | Back Side Temp (° C.) | Transmission (%) | Haze (%) |
|---|---|---|---|---|---|---|
| Shrink Film 1 with Film 1 | 0.44 | Transfer PSA 3 | yes | 165 | na | Na |

Rigid to Rigid Substrates: Mixed Failure Mode: Cohesive Failure at Room Temperature and Adhesive Failure at 100 C Examples Sample Preparation Gel Adh 1 was mixed with static mixing dispenser and spread onto a 50 mm×75 mm×1 mm glass slide, then a piece Shrink Film 2 was placed on top and hand rolled to give a gel thickness of approximately 76 micrometers. Gel Adh 1 was then dispensed on top surface of Shrink Film 2 and a second glass slide was placed on top. This assembly was once again rolled to spread the top layer of Gel Adh 1 to a thickness of approximately 76 micrometers. The entire sample was then cured at 25° C. for 24 hours.

Optical properties and Failure Force were measured using the 90° Peel Adhesion and High Temp Peel 100° C. test method described above. Results are reported in Table 6. Shrink-Off test was then carried out using the test method described above. The results are shown in Table 6.

TABLE 6

Cohesive failure at room temperature and adhesive failure at 100 C.

| PSA Description | Cohesive Failure Force @RT(N/dm) | Adhesive Failure Force @100 C. (N/dm) | Shrink Film Type | Separated Glass | Back Side Temp (° C.) | Transmission | Haze |
|---|---|---|---|---|---|---|---|
| Gel Adh 1 | 5.62 | 0.42 | Shrink Film 2 | yes | 105 | 93.5 | 4.02 |

Flexible to Rigid Substrates (Shrink Film as a Front Surface Film): PSA to Film Interface Failure Examples Sample Preparation PSA transfer tapes were laminated to one side of the shrink films listed in Table 7. Optical properties and Failure Force from shrink film were measured for each sample. Shrink Film/PSA constructions were tested for Failure Force using the 90° Peel Adhesion test method described above and optical properties were measured using the Transmission and Haze measurements test method described above. Results are reported in Table 7.

Heat separation evaluations of the samples were also performed. The Shrink Film/PSA constructions were laminated to 50 mm×75 mm×1 mm glass slides. In this case, as this is a flexible to rigid lamination, the wet out area was 95% or greater.

Shrink-Off tests were carried out using the test method described above, except for these front surface film examples, heat was applied directly to the front surface film. If the Film curled upon heat and was therefore easily removable upon cooling, then the sample was designated a 'yes'. If the film did not curl sufficiently to be easily removed, then the sample was designated a 'no'. The results are shown in Table 7.

TABLE 7

Front Surface PSA to Film Interface Failure

| Transfer Tape | Shrink Film Type | Failure Force (N/dm) | Film Only Curled off upon heat | Back Side Temp (° C.) | Transmission (%) | Haze (%) |
|---|---|---|---|---|---|---|
| Transfer PSA 2 | Shrink Film 2 | 2.87 | Yes | 110 | 94.5 | 1.10 |
| Transfer PSA 1 | Shrink Film 2 | 3.90 | Yes | 120 | 91.4 | 2.53 |
| Transfer PSA 3 | Shrink Film 2 | 46.8 | No | 175 | 94.2 | 2.03 |

Flexible to Rigid Substrates (Shrink Film as a Front Surface Film): PSA to Glass Interface Failure Examples Formulation and Sample Preparation PSA formulations were prepared using the following procedure. Components were added to each mixture in the solids weight percentages specified in the PSA formulation table. Bottles of the mixtures were rolled on a roller mixer for 1 hour. Mixing was done at room temperature.

The resultant mixtures were cast onto shrink film (as specified in Table 8) to form a Shrink Film/PSA construction. Shrink film, PSA formulation, release liner were placed in a marble top knife coater, which was gapped to yield 50-75 micrometers of coating. The multi-layer construction was pulled under the knife die to spread the PSA formulation to the prescribed thickness. The resulting construction was UV cured with 2 passes at 23 m/min at 100% power using a Fusion F600 high intensity UV lamp (D bulb) from Fusion UV Systems Inc, Gaithersburg. Sample using a transfer tape as the PSA were made by simple hand lamination of transfer tape to one side of the shrink film.

Optical properties and Failure Force from glass were measured for each sample. Shrink Film/PSA constructions were tested for Failure Force using the 90° Peel Adhesion test method described above and optical properties were measured using the Transmission and Haze measurements test method described above. Results are reported in Table 8.

Heat separation evaluations of the samples were also performed. The Shrink Film/PSA constructions were laminated to 50 mm×75 mm×1 mm glass slides. In this case, as this is a flexible to rigid lamination, the wet out area was 95% or greater.

Shrink-Off tests were carried out using the test method described above, except for these front surface film examples, heat was applied directly to the front surface film. If the Film and PSA curled upon heat and was therefore easily removable upon cooling, then the sample was designated a 'yes'. If the film and PSA did not curl sufficiently to be easily removed, then the sample was designated a 'no'. The results are shown in Table 8.

Semi-Rigid to Rigid Substrates: PSA to Semi-Rigid Substrate Interface Failure

Formulation and Sample Preparation

PSA formulations were prepared using the following procedure. Components were added to each mixture in the solids weight percentages specified in the PSA formulation table. Bottles of the mixtures were rolled on a roller mixer for 1 hour. Mixing was done at room temperature.

The resultant mixtures were cast onto shrink film (as specified in Table 2) to form a PSA/Film/PSA construction. Release liner, PSA formulation, shrink film, PSA formulation, release liner were placed in a marble top knife coater, which was gapped to yield 50-75 micrometers of coating on each side. The multi-layer construction was pulled under the knife die to spread the PSA formulation to the prescribed thickness on each side of the base film. The resulting construction was UV cured with 2 passes at 23 m/min at 100% power using a Fusion F600 high intensity UV lamp (D bulb) from Fusion UV Systems Inc, Gaithersburg. Samples where the PSA is a transfer tape were made by simple hand lamination of transfer tape to each side of the shrink film.

Optical properties and Failure Force from glass were measured for each sample. PSA/Shrink Film/PSA constructions were tested for Failure Force using the 90° Peel Adhesion test method described above and optical properties were measured using the Transmission and Haze measurements test method described above. Results are reported in Table 9.

Heat separation evaluations of the samples were also performed. The PSA/Shrink Film/PSA constructions were laminated to the Semi-Rigid Substrate, 57 mm×57 mm. This was then laminated to a 75 mm×75 mm×1 mm glass slide. In this case, as this is a semi-rigid to rigid lamination, the wet out area was 95% or greater in all examples.

Shrink-Off tests were carried out using the test method described above, except instead of heat being applied with a heat gun, the sample was placed in a 140° C. oven for 3 minutes. In this specific example the fragile 100 micrometer Ultra-Thin Glass was separated from the rigid glass substrate without breaking. The results are shown in Table 9.

TABLE 8

Front Surface Film PSA to Glass Interface Failure

| PSA (Transfer Tape) Description | Shrink Film Type | Failure Force (N/dm) | Both Film and PSA Curled off upon heat | Back Side Temp C. | Transmission (%) | Haze (%) |
|---|---|---|---|---|---|---|
| PSA 3 | Shrink Film 2 | 1.70 | Yes | 90 | na | Na |
| PSA 6 | Shrink Film 2 | 3.22 | Yes | 90 | na | Na |
| PSA 5 | Shrink Film 2 | 8.97 | Yes | 120 | na | Na |
| Transfer PSA 2 | Shrink Film 2 | 15.3 | No | 175 | 94.5 | 1.10 |
| Transfer PSA 3 | Shrink Film 2 | 46.8 | No | 175 | 94.2 | 2.03 |

TABLE 9

Semi-Rigid to Rigid Substrates: PSA to Semi-Rigid Substrate InterfaceFailure

| PSA Description | Failure Force (N/dm) | Shrink Film Type | Semi-Rigid Substrate Type | Semi-Rigid Glass Separated from Rigid Glass | Oven Temp (° C.) | Transmission (%) | Haze (%) |
|---|---|---|---|---|---|---|---|
| PSA 3 | 1.70 | Shrink Film 2 | Semi-Rigid Substrate 1 | yes | 140 | 95.7 | 0.79 |

What is claimed is:

1. An adhesive article comprising:
    a first layer of optically clear adhesive consisting of a pressure sensitive adhesive, a heat activated adhesive, or a gel adhesive with a first major surface and a second major surface;
    a heat-shrinkable optical substrate with a first major surface and a second major surface, wherein the first major surface of the heat-shrinkable substrate is disposed on the second major surface of the first layer of optically clear adhesive; and
    a second layer of optically clear adhesive consisting of a pressure sensitive adhesive, a heat activated adhesive, or a gel adhesive with a first major surface and second major surface, wherein the first major surface of the second layer of optically clear adhesive is disposed on the second major surface of the heat-shrinkable substrate, wherein at least part of the heat-shrinkable substrate has a threshold shrink force of at least 100 grams per inch (3.85 N/dm), and the first adhesive layer and the second adhesive layer each has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising either the first adhesive layer and the heat shrinkable substrate or the second adhesive layer and the heat shrinkable substrate, and wherein the optically clear adhesives have a visible light transmission of at least 90% and a haze of less than 5%, and wherein the shrink force and Failure Force cause de-bonding upon the application of energy consisting of heat.

2. The adhesive article of claim 1, wherein the Failure Force of the first adhesive layer comprises cohesive failure of the first adhesive layer, and the Failure Force of the second adhesive layer comprises cohesive failure of the second adhesive layer.

3. The adhesive article of claim 1, wherein the Failure Force of the first adhesive layer comprises adhesive failure of the first adhesive layer to the glass substrate, and the Failure Force of the second adhesive layer comprises adhesive failure of the second adhesive layer to the glass substrate.

4. The adhesive article of claim 1, wherein the heat-shrinkable optical substrate comprises a multi-layer substrate and wherein the Failure Force of the first adhesive layer comprises the peeling away of some layers of the multi-layer substrate and the retention of at least one layer of the multi-layer substrate to the first adhesive layer, and the Failure Force of the second adhesive layer comprises the peeling away of some layers of the multi-layer substrate and the retention of at least one layer of the multi-layer substrate to the second adhesive layer.

5. The adhesive article of claim 1, wherein the Failure Force of the first adhesive layer and the Failure Force of the second adhesive layer comprises peeling away of the heat-shrinkable optical substrate from the adhesive layer.

6. The adhesive article of claim 1, wherein at least one of the first layer of optically clear adhesive and the second layer of optically clear adhesive consists of a pressure sensitive adhesive.

7. The adhesive article of claim 1, wherein the heat-shrinkable substrate comprises a film comprising a polyolefin film, a poly(meth)acrylate film, a polyester film, a polystyrene film, a polycarbonate film, a vinyl film, a cellulose-based film, or films comprising blends thereof.

8. An article comprising:
    a first optical substrate with a first major surface and a second major surface;
    a first layer of optically clear adhesive consisting of a pressure sensitive adhesive, a heat activated adhesive, or a gel adhesive with a first major surface and a second major surface, wherein the first major surface of the first layer of optically clear adhesive is disposed on the second major surface of the first optical substrate;
    a heat-shrinkable optical substrate with a first major surface and a second major surface, wherein the first major surface of the heat-shrinkable substrate is disposed on the second major surface of the first layer of optically clear adhesive;
    a second layer of optically clear adhesive consisting of a pressure sensitive adhesive, a heat activated adhesive, or a gel adhesive with a first major surface and second major surface, wherein the first major surface of the second layer of optically clear adhesive is disposed on the second major surface of the heat-shrinkable substrate; and
    a second optical substrate with a first major surface and a second major surface, wherein the first major surface of the second optical substrate is disposed on the second major surface of the second layer of optically clear adhesive; and wherein at least part of the heat-shrinkable substrate has a threshold shrink force of at least 100 grams per inch (3.85 N/dm), and the first adhesive layer and the second adhesive layer each has a Failure Force of from 0.1 to 85 grams per inch (0.039-3.3 N/dm), where the Failure Force is determined by measuring the 90° Peel Adhesion at room temperature or the 180° Peel Adhesion at 100° C. to a glass substrate of an article comprising either the first adhesive layer and the heat shrinkable substrate or the second adhesive layer and the heat shrinkable substrate, and wherein the optically clear adhesives have a visible light transmission of at least 90% and a haze of less than 5%, wherein the shrink force and the Failure Force cause de-bonding upon the application of energy consisting of heat, and wherein the first and second optical substrates comprise substrates that are optically clear to visible light, and comprise rigid plates or semi-rigid substrates with a thickness of 100 micrometers.

9. The article of claim 8, wherein at least one of the first layer of optically clear adhesive and the second layer of optically clear adhesive consists of a pressure sensitive adhesive.

10. The article of claim 8, wherein at least one of the first layer of optically clear adhesive and the second layer of optically clear adhesive consists of a gel adhesive.

11. The article of claim 8, wherein the heat-shrinkable substrate comprises a film comprising a polyolefin film, a poly(meth)acrylate film, a polyester film, a polystyrene film, a polycarbonate film, a vinyl film, a cellulose-based film, or films comprising blends thereof.

12. An article comprising:
a first optical substrate with a first major surface and a second major surface;
a first layer of optically clear adhesive consisting of a pressure sensitive adhesive, a heat activated adhesive, or a gel adhesive with a first major surface and a second major surface, wherein the first major surface of the first layer of optically clear adhesive is disposed on the second major surface of the first optical substrate; and
a heat-shrinkable optical substrate with a first major surface and a second major surface, wherein the first major surface of the heat-shrinkable optical substrate is disposed on the second major surface of the first layer of optically clear adhesive;
wherein at least part of the heat-shrinkable substrate has a threshold shrink force of at least 100 grams per inch (3.85 N/dm), and the first adhesive layer has a Failure Force of from 0.1 to 400 grams per inch (0.039-15.4 N/dm), where the Failure Force is determined by measuring either the 90° Peel Adhesion at room temperature or the 180° Peel Adhesion at 100° C. to a glass substrate of an article comprising the first adhesive layer and the heat shrinkable optical substrate, and wherein the optically clear adhesives have a visible light transmission of at least 90% and a haze of less than 5%, wherein the shrink force and the Failure Force cause de-bonding upon the application of energy consisting of heat and wherein the first optical substrate comprises a substrate that is optically clear to visible light, and comprises a rigid plate or semi-rigid substrate with a thickness of 100 micrometers.

* * * * *